(12) United States Patent
Nakashio

(10) Patent No.: US 11,503,188 B2
(45) Date of Patent: Nov. 15, 2022

(54) IMAGE PROCESSING APPARATUS, CONTROL METHOD FOR CONTROLLING IMAGE PROCESSING APPARATUS, AND STORAGE MEDIUM

(71) Applicant: CANON KABUSHIKI KAISHA, Tokyo (JP)

(72) Inventor: Hidekazu Nakashio, Warabi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/351,853

(22) Filed: Jun. 18, 2021

(65) Prior Publication Data

US 2021/0314464 A1 Oct. 7, 2021

Related U.S. Application Data

(63) Continuation of application No. 16/660,425, filed on Oct. 22, 2019, now Pat. No. 11,070,704.

(30) Foreign Application Priority Data

Oct. 31, 2018 (JP) .............................. JP2018-205877

(51) Int. Cl.
*H04N 1/60* (2006.01)
*H04N 1/00* (2006.01)

(52) U.S. Cl.
CPC ....... *H04N 1/6022* (2013.01); *H04N 1/00806* (2013.01); *H04N 1/6027* (2013.01); *H04N 1/6075* (2013.01); *H04N 1/6094* (2013.01)

(58) Field of Classification Search
None
See application file for complete search history.

(56) References Cited

U.S. PATENT DOCUMENTS

| | | | | |
|---|---|---|---|---|
| 2008/0094517 | A1* | 4/2008 | Takeuchi | H04N 1/40012 348/E9.037 |
| 2008/0205751 | A1* | 8/2008 | Mischler | G06V 10/143 382/163 |
| 2009/0109493 | A1* | 4/2009 | Takahashi | H04N 1/00925 358/3.28 |
| 2010/0123915 | A1* | 5/2010 | Kashimoto | H04N 1/62 358/1.9 |
| 2011/0128562 | A1* | 6/2011 | Anazawa | G06T 11/001 358/1.9 |
| 2012/0045126 | A1* | 2/2012 | Tomohiro | H04N 1/62 382/167 |
| 2013/0021626 | A1* | 1/2013 | Kim | H04N 1/622 358/1.9 |
| 2014/0092407 | A1* | 4/2014 | Sawada | H04N 1/6075 358/1.9 |

(Continued)

FOREIGN PATENT DOCUMENTS

| | | |
|---|---|---|
| JP | 2011-119929 A | 6/2011 |
| JP | 2011-188484 A | 9/2011 |

*Primary Examiner* — Dung D Tran
(74) *Attorney, Agent, or Firm* — Canon U.S.A., Inc. IP Division

(57) ABSTRACT

In a document represented by CMYK process colors, a color that a user wishes to remove is prevented from remaining without being removed by specified color removal, and even a color that the user does not wish to remove by rights is prevented from being removed.

10 Claims, 16 Drawing Sheets

(56) References Cited

U.S. PATENT DOCUMENTS

| | | | |
|---|---|---|---|
| 2015/0281520 A1* | 10/2015 | Sawada | H04N 1/40093 |
| | | | 358/474 |
| 2016/0163066 A1* | 6/2016 | Ishihara | G06V 10/60 |
| | | | 382/162 |
| 2019/0045087 A1* | 2/2019 | Shimamura | H04N 1/62 |
| 2019/0238722 A1* | 8/2019 | Nakashio | H04N 1/6008 |

* cited by examiner

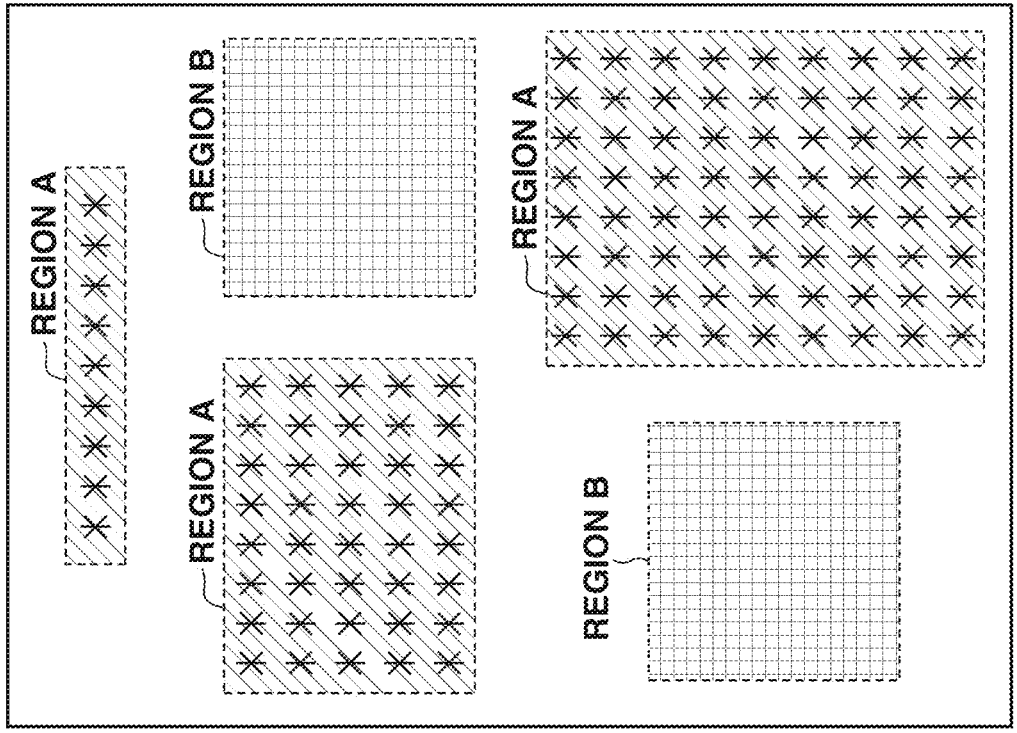
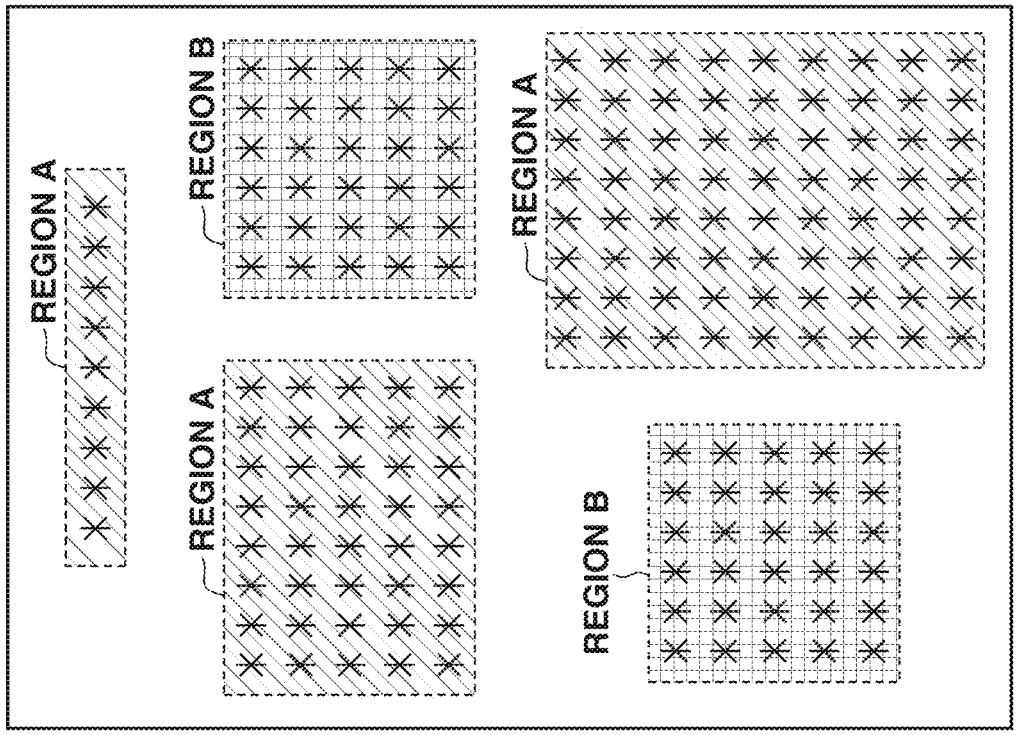

FIG.7
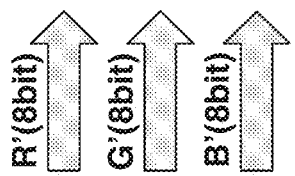
| Index | Input R | Input G | Input B | Output R | Output G | Output B |
|---|---|---|---|---|---|---|
| 0 | 0 | 0 | 0 | 0 | 0 | 0 |
| 1 | 0 | 0 | 15 | 0 | 0 | 19 |
| 2 | 0 | 0 | 30 | 0 | 0 | 39 |
| ... | ... | ... | ... | ... | ... | ... |
| 15 | 0 | 0 | 255 | 0 | 0 | 255 |
| 16 | 0 | 15 | 0 | 0 | 19 | 0 |
| 17 | 0 | 15 | 15 | 0 | 20 | 15 |
| ... | ... | ... | ... | ... | ... | ... |
| 4094 | 255 | 255 | 240 | 252 | 251 | 240 |
| 4095 | 255 | 255 | 255 | 255 | 255 | 255 |
Three-Dimensional LUT
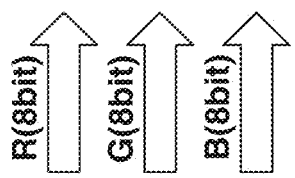

FIG.10A
VARIOUS PARAMETERS

| | PARAMETER | RED | GREEN | BLUE | BLACK | REMARKS |
|---|---|---|---|---|---|---|
| DEFAULT (= def) | SATURATION WIDTH THRESHOLD | 32 | 32 | 32 | 32 | (RANGE: 0 - 128) |
| | HUE CENTRAL ANGLE | 340° | 200° | 100° | ABSENT | (RANGE: 0° - 359°) |
| | HUE WIDTH THRESHOLD | 30° | 25° | 35° | ABSENT | (RANGE: 0° - 179°) |
| MODE OF WIDENING REMOVAL RANGE | SATURATION WIDTH THRESHOLD | def - 16 | def - 12 | def - 10 | def + 16 | |
| | HUE CENTRAL ANGLE | SAME AS def | SAME AS def | SAME AS def | ABSENT | |
| | HUE WIDTH THRESHOLD | def + 5° | def + 15° | def + 10° | ABSENT | |

FIG.10B
HUE CENTRAL ANGLE PARAMETER WHEN TINT IS ADJUSTED

| | ADJUSTMENT WIDTH | HUE CENTRAL ANGLE |
|---|---|---|
| HUE CENTRAL ANGLE WHEN RED IS SPECIFIED (WHEN TINT IS ADJUSTED) | CLOSER TO MAGENTA (LEVEL 2) | def + 20° |
| | CLOSER TO MAGENTA (LEVEL 1) | def + 10° |
| | def | 340° |
| | CLOSER TO YELLOW (LEVEL 1) | def - 10° |
| | CLOSER TO YELLOW (LEVEL 2) | def - 20° |
| HUE CENTRAL ANGLE WHEN GREEN IS SPECIFIED (WHEN TINT IS ADJUSTED) | CLOSER TO YELLOW (LEVEL 2) | def + 20° |
| | CLOSER TO YELLOW (LEVEL 1) | def + 10° |
| | def | 340° |
| | CLOSER TO CYAN (LEVEL 1) | def - 10° |
| | CLOSER TO CYAN (LEVEL 2) | def - 20° |
| HUE CENTRAL ANGLE WHEN BLUE IS SPECIFIED (WHEN TINT IS ADJUSTED) | CLOSER TO CYAN (LEVEL 2) | def + 20° |
| | CLOSER TO CYAN (LEVEL 1) | def + 10° |
| | def | 340° |
| | CLOSER TO MAGENTA (LEVEL 1) | def - 10° |
| | CLOSER TO MAGENTA (LEVEL 2) | def - 20° |

FIG. 12

| DOCUMENT | CHROMATICITY | EXPECTED VALUE | SPECIFIED COLOR REMOVAL (STANDARD) |
|---|---|---|---|
| 1201 (1) RED (SPOT COLOR) | 1204 | 1209 REMOVED | 1214 ○ REMOVED |
| 1202 (2) RED (PROCESS COLORS) 1211 1210 | 1205 1206 1207 | 1212 REMOVED | 1215 × NOT REMOVED |
| 1203 (3) YELLOW (SPOT COLOR) | 1208 | 1213 NOT REMOVED | 1216 ○ NOT REMOVED |

COMPARISON BETWEEN
FEATURE AMOUNTS
(STANDARD DEVIATIONS
OF LUMINANCE)

| | DOCUMENT 1301 | DOCUMENT 1302 | DOCUMENT 1303 |
|---|---|---|---|
| BEFORE SPECIFIED COLOR REMOVAL (STANDARD DEVIATION (2)) | 1.67 | 11.37 | 1.82 |
| AFTER SPECIFIED COLOR REMOVAL (STANDARD DEVIATION (1)) | 0 | 45.14 | 1.82 |

CASE WHERE
THRESHOLD = 20

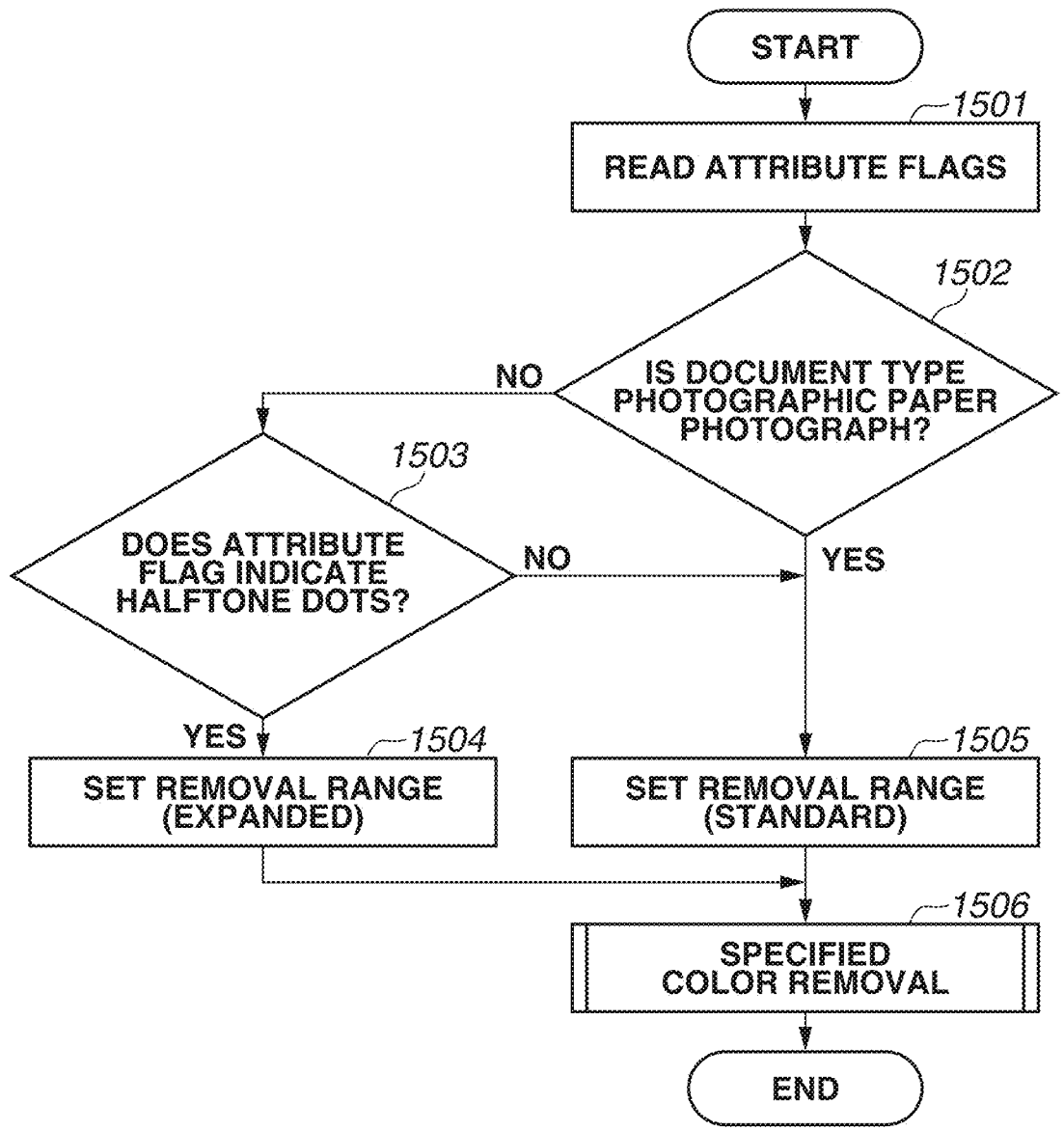

IMAGE PROCESSING APPARATUS, CONTROL METHOD FOR CONTROLLING IMAGE PROCESSING APPARATUS, AND STORAGE MEDIUM

CROSS-REFERENCE TO RELATED APPLICATION

This application is a Continuation of U.S. application Ser. No. 16/660,425, filed Oct. 22, 2019, which claims priority from Japanese Patent Application No. 2018-205877, filed Oct. 31, 2018, which are hereby incorporated by reference herein in their entireties.

BACKGROUND

Field

The present disclosure relates to an image processing apparatus that removes a color from image data based on a color specified by a user, a control method for controlling the image processing apparatus, and a storage medium.

Description of the Related Art

Conventionally, there is a function of removing a particular color component from color components included in image data obtained by a printed document being read. This process of removing the particular color component is referred to as "specified color removal" (or referred to as "color dropout").

For example, in a case where a rule in a white form is green, and if green is removed by performing specified color removal, colors other than green in this document are not removed, and only the green rule is removed. This produces effects of removing unnecessary color information and improving readability. The removal of a frame in the form also provides an effect of improving the accuracy of character recognition.

In a case where a document where black text is colored with a red pen marker is read, and if red is removed, this provides the effect of enabling the removal of only a portion colored with the red pen marker.

The publication of Japanese Patent Application Laid-Open No. 2011-188484 discusses, as a processing method for this specified color removal, a method for identifying a lattice point in a three-dimensional lookup table (LUT) corresponding to a color to be removed that is specified by a user, and converting an LUT value corresponding to the lattice point into a white pixel value. As another method, a method for determining a removal range based on a hue angle and a hue width on a color difference plane and executing specified color removal based on the removal range is discussed.

SUMMARY

Conventionally, a method for representing a color in printing has two types, namely a method using a process color representing a color using cyan, magenta, yellow, and black (CMYK) standard toners, and a method using a spot color representing a color using a toner prepared to represent a color that cannot be reproduced by CMYK. However, it has now been determined that in a case where a color is represented by a process color, the color is represented by the area gradations of a plurality of different colors, and thus even if specified color removal is performed, the color remains without being removed.

Moreover, it is has now also been determined that if a color is removed by widening the removal range from the start and performing the specified color removal based on the methods in the publication of Japanese Patent Application Laid-Open No. 2011-188484, even a color that the user does not wish to remove may be removed.

In consideration of the above-discussed issues, according to an aspect of the present disclosure, an image processing apparatus includes a specifying unit configured to specify a color, a setting unit configured to set a range of hue of a color to be removed based on the color specified by the specifying unit, an expansion unit configured to, based on a feature amount of image data before a color of a partial area of the image data is removed based on the range of the hue set by the setting unit, and a feature amount of image data after the color of the partial area is removed based on the range of the hue set by the setting unit, expand a range of hue to be removed in the partial area, and a removal unit configured to remove the color of the partial area based on the range of the hue expanded by the expansion unit.

Further features of the present disclosure will become apparent from the following description of exemplary embodiments with reference to the attached drawings.

BRIEF DESCRIPTION OF THE DRAWINGS

FIGS. 4A and 4B are diagrams illustrating sample images before and after a specified color removal process.

FIG. 7 is an image diagram illustrating an example of a three-dimensional lookup table (LUT) process.

FIGS. 10A and 10B are diagrams each illustrating parameters to be used in the specified color removal.

FIG. 12 is an image diagram illustrating an example of an issue of the specified color removal.

FIG. 15 is a detailed flowchart of a process of performing specified color removal according to a second exemplary embodiment.

DESCRIPTION OF THE EMBODIMENTS

Exemplary embodiments of the present disclosure will be described in detail below with reference to the drawings.

Components described in the exemplary embodiments, however, are merely illustrative, and are not intended to limit the scope of the present disclosure to them.

<Overall Configuration of System>

Figure 1:
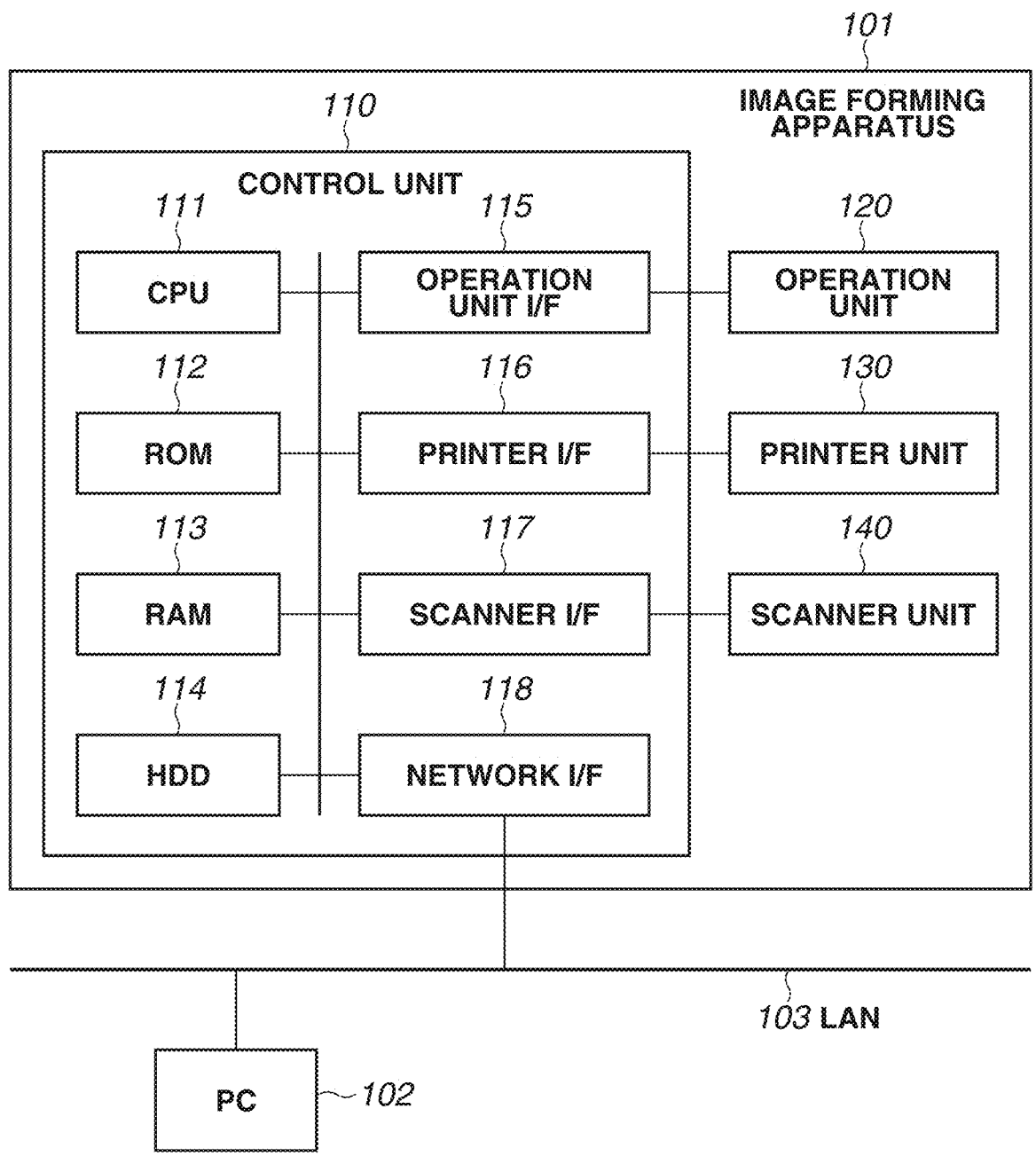
FIG. 1 is a hardware configuration diagram of an image forming apparatus.

A first exemplary embodiment of the present disclosure will be described below. FIG. 1 is a diagram illustrating the overall configuration of a printing system according to the present exemplary embodiment. The printing system illustrated in FIG. 1 includes an image forming apparatus 101 and a personal computer (PC) 102, which are connected to each other via a local area network (LAN) 103. The image forming apparatus 101 is an example of an image processing apparatus. The image forming apparatus 101 receives print data from the PC 102 and performs printing. The image forming apparatus 101 transmits image data obtained by reading a document to the PC 102.

A control unit 110 includes a central processing unit (CPU) 111 and controls entire operations of the image forming apparatus 101. The CPU 111 loads control programs stored in a read-only memory (ROM) 112 into a random-access memory (RAM) 113 and performs various types of control such as reading control, transmission control, and print control. The CPU 111 may be a single processor, or may include a plurality of processors. The ROM 112 stores various programs to be read by the CPU 111. The RAM 113 is used as a temporary storage area, such as a main memory or a work area for the CPU 111.

A hard disk drive (HDD) 114 stores image data, various programs, or various information tables. An operation unit interface (I/F) 115 is an interface for connecting an operation unit 120 and the control unit 110. The operation unit 120 includes a liquid crystal display having a touch panel function and a keyboard and functions as a user interface for receiving an operation from a user.

A printer I/F 116 is an interface for connecting a printer unit 130 and the control unit 110. Image data to be printed by the printer unit 130 is input to the printer unit 130 from the control unit 110 via the printer I/F 116. Then, the printer unit 130 prints an image based on the input image data on a recording medium, such as paper. The printing method may be an electrophotographic method, or may be an inkjet method.

A scanner I/F 117 is an interface for connecting a scanner unit 140 and the control unit 110. The scanner unit 140 reads an image of a document, and generates image data. The generated image data is input to the control unit 110 via the scanner I/F 117.

A network I/F 118 is an interface for connecting the control unit 110 and the LAN 103. The network I/F 118 transmits image data or information to an external apparatus (e.g., a cloud service server, not illustrated) on the LAN 103, and receives various pieces of information from the external apparatus on the LAN 103.

The image forming apparatus 101 may include an identification (ID) card reader and have the function of reading information in an ID card and authenticating the user based on the read information.

<Execution Flow of Copy Function>

Figure 2:
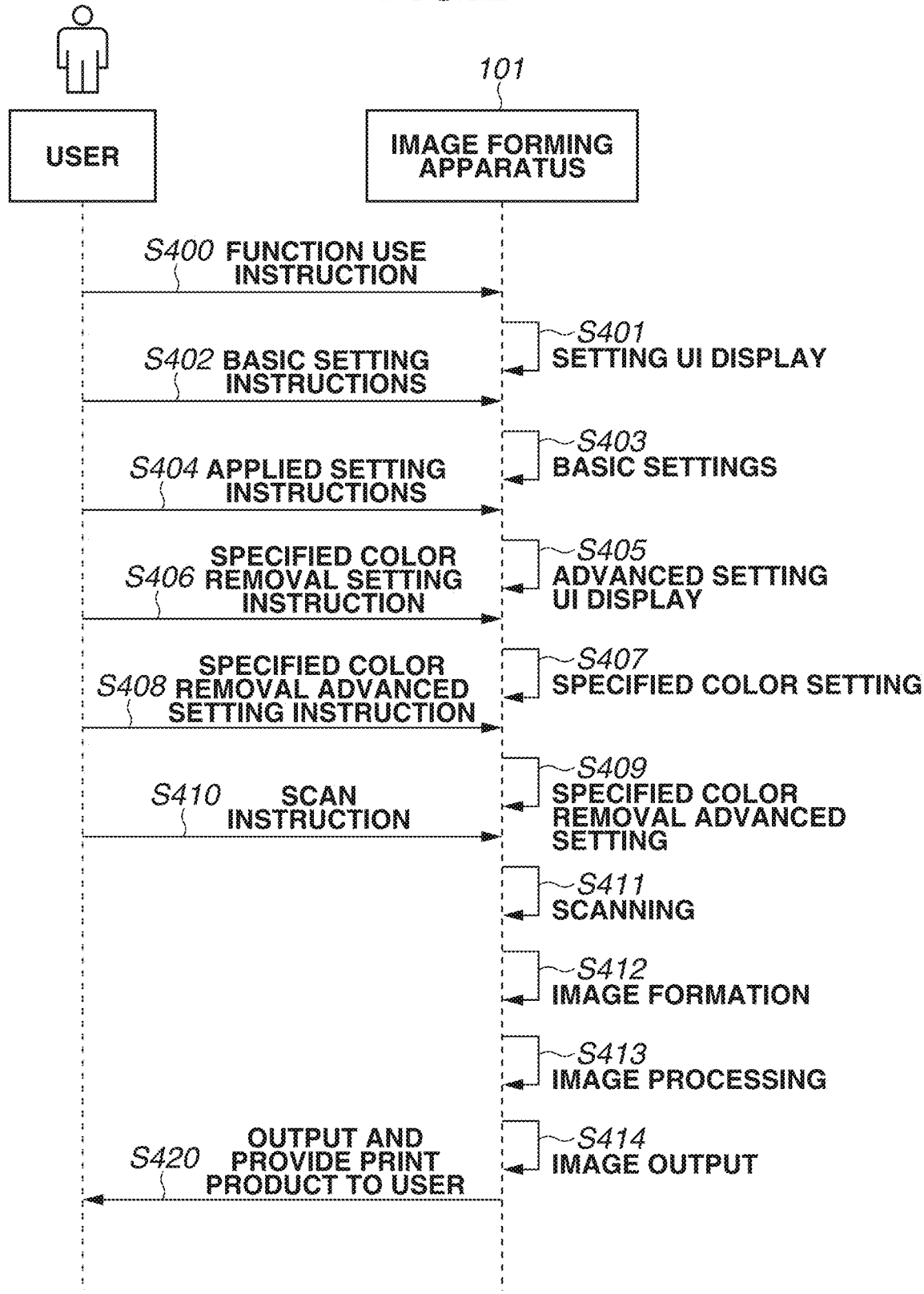
FIG. 2 is a sequence diagram illustrating an interaction between a user and the image forming apparatus.

Next, a detailed description will be provided of the processing in which the user and the image forming apparatus 101 interact with each other in executing a copy function with reference to a sequence diagram illustrated in FIG. 2 and user interface (UI) diagrams illustrated in FIGS. 3A, 3B, 3C, 3D, and 3E. This processing is implemented by the CPU 111 of the image forming apparatus 101 reading a control program stored in the ROM 112 and executing the control program.

In a function-use-instruction in step S400, the image forming apparatus 101 receives the pressing of the operation unit 120 from the user, thus receiving an instruction to start the copy function. Functions that can be performed by the image forming apparatus 101 are displayed as buttons in a main menu UI 500 displayed on the operation unit 120 illustrated in FIG. 3A. For example, a copy function button 501, a scan-and-transmit function button 502, a scan-and-save function button 503, a use-saved-file function button 504, and a print function button 505 are displayed. The image forming apparatus 101 receives the selection of a function that the user wishes to perform among these functions. If the user gives an instruction to start the copy function, the image forming apparatus 101 receives the pressing of the copy function button 501 from the user and executes the function use instruction in step S400.

Figure 3A:
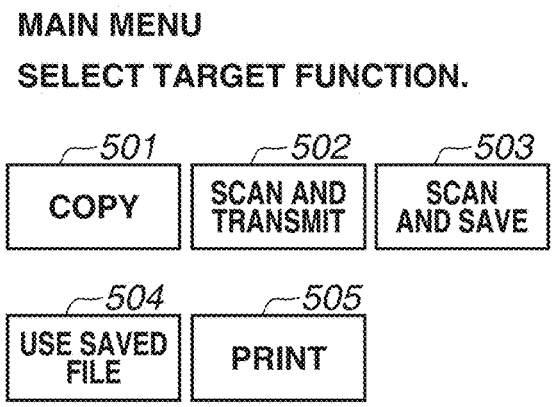
FIGS. 3A, 3B, 3C, 3D, and 3E are diagrams each illustrating an example of a user interface (UI) for removing a specified color.
Figure 3B:
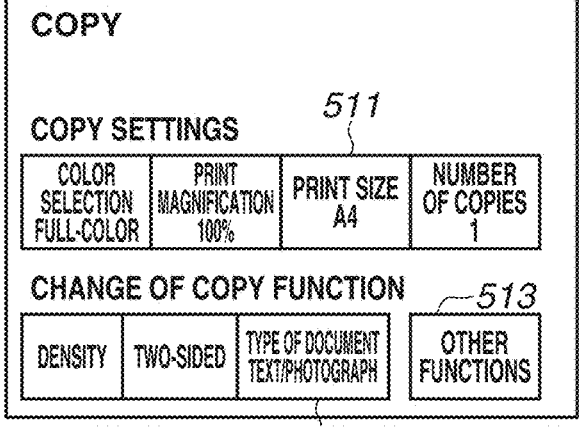
Figure 3C:
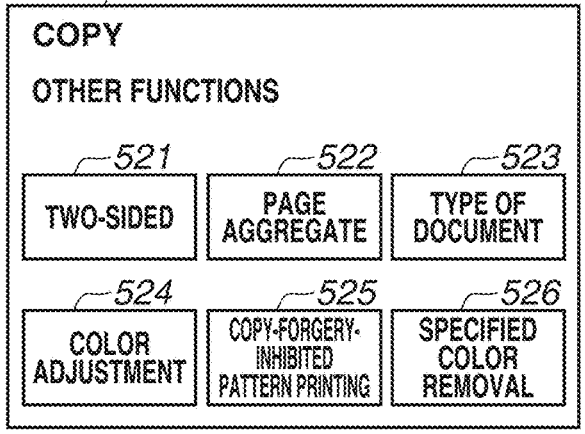
Figure 3D:
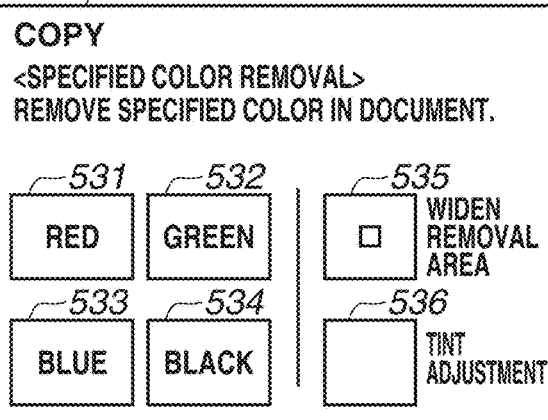

In setting UI display in step S401, the operation unit 120 of the image forming apparatus 101 displays an initial state screen for various settings of the copy function. A copy setting UI 510 displayed on the operation unit 120 illustrated in FIG. 3B indicates the states of various settings of the copy function. For example, in basic settings 511, the states of the selection of the color of printing, the selection of the print magnification, the selection of the document/print size, and the selection of the number of copies are displayed. Additionally, in copy applied settings 512, frequently used settings of the copy function, such as the selection of the adjustment of the print density, the selection of two-sided printing, and the type of document (text, text/photograph, map, printed photograph, or photographic paper photograph), are displayed. In other function settings 513, a button is arranged that allows settings for selecting applied functions to be used for particular uses. The functions set through the screen in FIG. 3B are stored in the HDD 114.

In basic setting instructions in step S402, the image forming apparatus 101 receives instructions to make the basic settings of the copy function from the user. For example, the image forming apparatus 101 receives the pressing of the basic settings 511 and receives instructions, such as the selection of the color of printing, the selection of the print magnification, the selection of the document/print size, and the selection of the number of copies.

In basic settings in step S403, the image forming apparatus 101 stores the basic settings of the copy function selected by the user as setting values in the RAM 113 of the image forming apparatus 101.

In applied setting instructions in step S404, the image forming apparatus 101 receives instructions to make the applied settings of the copy function from the user. For example, the image forming apparatus 101 receives the pressing of the copy applied settings 512 and/or the other function settings 513, and receives instructions to make settings for selecting applied functions. The image forming apparatus 101 receives the pressing of the other function settings 513 from the user and displays a UI illustrated in FIG. 3C on the operation unit 120. In an "other function setting UI 520", various applied functions of the copy function that can be executed by the image forming apparatus 101 are displayed. For example, a two-sided printing selection button 521, a page aggregate selection button 522, a type-of-document selection button 523, a color adjustment button 524, a copy-forgery-inhibited pattern printing selection button 525, and a specified color removal selection button 526 are displayed. The two-sided printing selection button 521 and the type-of-document selection button 523 have the same functions as those of buttons included in the copy applied settings 512. The removal of a specified color refers to the replacement of a specified color with white.

In advanced setting UI display in step S405, a UI is displayed, in which the advanced settings of the applied settings is able to be made based on the applied setting instructions in step S404. In performing specified color removal, the image forming apparatus 101 receives the pressing of the specified color removal selection button 526 from the user and displays on the operation unit 120 an advanced setting screen 530 for the specified color removal illustrated in FIG. 3D.

In a specified color removal setting instruction in step S406, the image forming apparatus 101 receives from the user the selection of a color of which a particular color component the user wishes to remove. For example, a selection button 531 can be selected with red as a specified color. A selection button 532 can be selected with green as the specified color. A selection button 533 can be selected with blue as the specified color. A selection button 534 can be selected with black as the specified color. The types of colors that can be specified may be not only these four colors, namely red, blue, green, and black, but also other colors. The image forming apparatus 101 receives the pressing of any of the selection button 531 with red as the specified color, the selection button 532 with green as the specified color, the selection button 533 with blue as the specified color, and the selection button 534 with black as the specified color. In this manner, the image forming apparatus 101 receives the specifying of the color that the user wishes to remove. In the present exemplary embodiment, the description is given on the assumption that the user specifies the selection button 531 with red as the specified color.

In specified color setting in step S407, the image forming apparatus 101 stores the color to be removed as a setting value in the RAM 113, where the color is selected by the user in the specified color removal setting instruction in step S406.

Figure 3E:
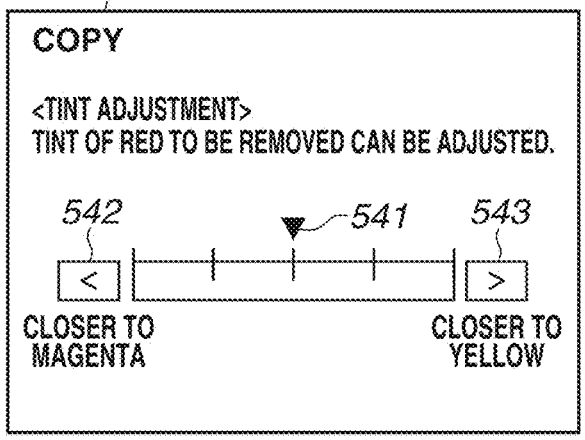

Additionally, in a specified color removal advanced setting instruction in step S408, the more advanced setting of the specified color removal can be made. For example, after the specified color is determined, a setting for widening the removal range of the specified color and removing the color in a wider range can be made. This realizes the mode of widening the removal range in which a setting for enabling the removal of the specified color is made even for a document which has a chromatic color close to an achromatic color, or in which a color is misregistered when the document is printed. Alternatively, after the specified color is determined, a setting for changing the hue of the specified color can be made. For example, after the selection button 531 is specified with red as the specified color, and if a tint adjustment mode 536 is selected, a tint adjustment setting UI 540 illustrated in FIG. 3E is displayed on the operation unit 120. A mark 541 indicates the current value. In the case of red, the tint of the color to be removed, such as color closer to magenta or closer to yellow, can be adjusted. For example, to remove red closer to magenta, the user presses a cursor button 542, thus setting the color to be removed to be closer to magenta. The setting of the color to be removed to be closer to magenta refers to the setting of the color to be removed to be a color in hue on the magenta side in a hue circle on a color difference plane. To remove red closer to yellow, the user presses a cursor button 543, thus setting the color to be removed to be on the yellow side.

In the present exemplary embodiment, a case has been described where red is specified. Also in the case of blue or green, however, a setting can be made, and an adjustment can be made in the direction of a color included in the specified color. In the present exemplary embodiment, however, only if the specified color is a chromatic color, the tint adjustment is permitted. In a case where a "widen removal range" button 535 is selected on the advanced setting screen 530 in FIG. 3D, and if the range of the color corresponds to a chromatic color, the range is expanded regarding hue and saturation. If the range of the color corresponds to an achromatic color, the range is expanded regarding saturation. The details of the process of widening the removal range will be described below with reference to FIGS. 10A and 10B.

In specified color removal advanced setting in step S409, the image forming apparatus 101 stores, as a setting value in the RAM 113 of the image forming apparatus 101, the more advanced setting of the specified color removal selected by the user in the specified color removal advanced setting instruction in step S408.

Next, in a scan instruction in step S410, the image forming apparatus 101 receives a scan execution instruction from the user and gives an instruction to execute a scan operation.

In scanning in step S411, the image forming apparatus 101 drives the scanner unit 140 to read a document placed on a document platen of the scanner unit 140. Alternatively, the image forming apparatus 101 conveys a document set on an auto document feeder (ADF) and reads the document.

In image formation in step S412, the CPU 111 converts an image read in the scanning in step S411 into an image in a bitmap format that can be handled in image processing.

In image processing in step S413, the CPU 111 acquires the image generated in the image formation in step S412 and performs image processing for copying on the image in the case of the copy function. In this processing, the specified color removal is performed.

In image output in step S414, the CPU 111 instructs the printer unit 130 to print the generated image. In step S420, the image forming apparatus 101 outputs a print product printed by the printer unit 130 to a sheet discharge tray. The details of steps S412, S413, and S414 will be described below with reference to FIGS. 5 and 6.

FIG. 4A illustrates an example of the document read in the scanning in step S411. FIG. 4B illustrates an example of the document printed in the image output in step S414. In the document illustrated in FIG. 4A, text formed with black toner is written in regions A indicated by a right-up diagonal line pattern. Text formed using red toner is written in regions B indicated by a grid pattern. A portion where text is written is indicated by "*". It is understood that in the document illustrated in FIG. 4B, the text formed with black toner in the regions A indicated by the right-up diagonal line pattern, is copied and printed without change. On the other hand, the text indicated by "*" formed with red toner in the region B indicated by the grid pattern is removed and not printed. In the present exemplary embodiment, a setting for removing a red color component is made. Thus, in this example, the regions formed using red toner are removed.

<Software Configuration of Image Forming Apparatus>

Figure 5:
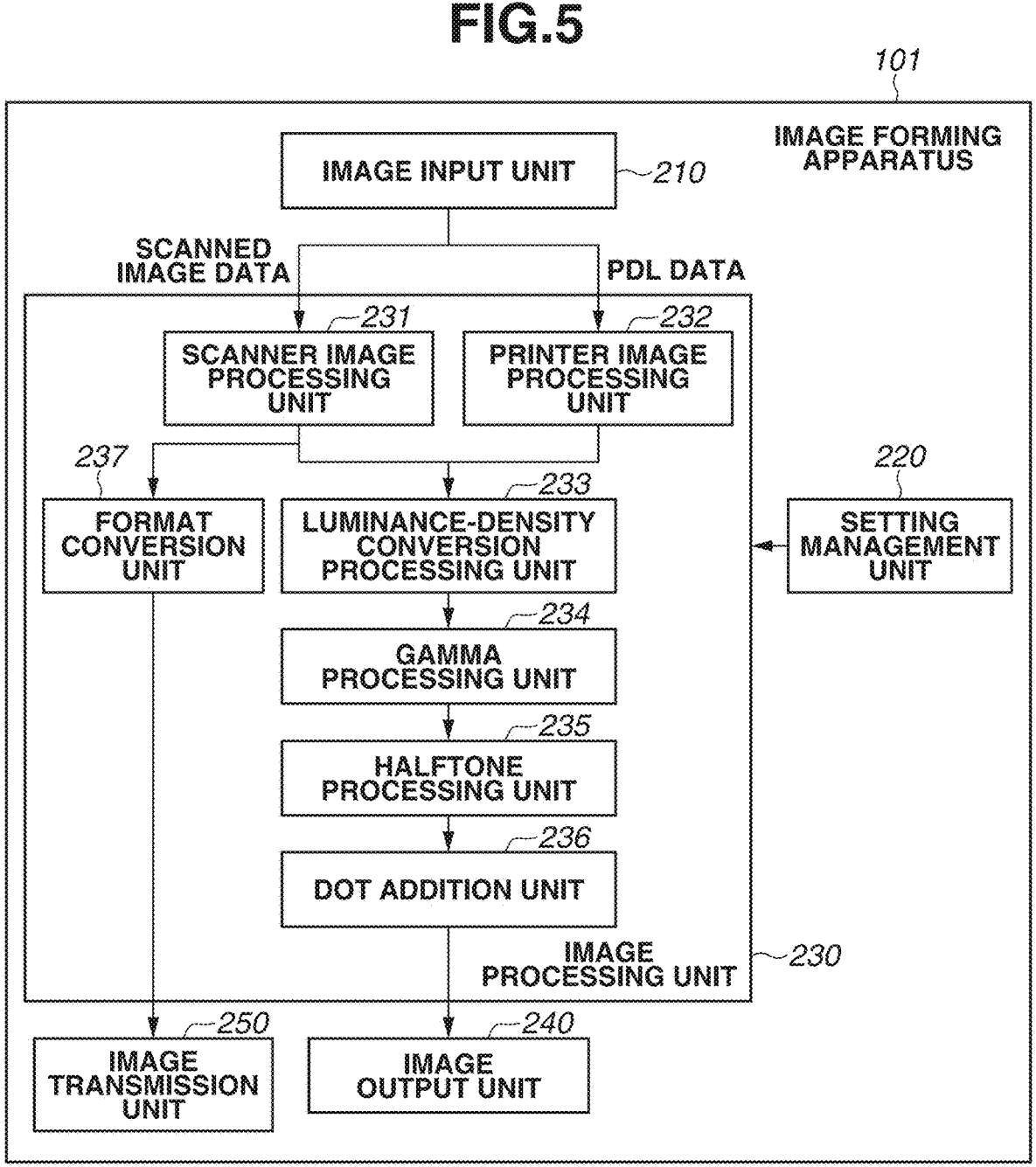
FIG. 5 is a block diagram illustrating an example of processing to be executed by the image forming apparatus.

FIG. 5 is a block diagram illustrating an example of the software configuration of the image forming apparatus 101 that causes the copy function, a scan-and-transmit function, and a print function to operate. The image forming apparatus 101 includes function units, such as an image input unit 210, a setting management unit 220, an image processing unit 230, an image output unit 240, and an image transmission unit 250. These function units are implemented by the CPU 111 of the image forming apparatus 101 loading a control program stored in the ROM 112 into the RAM 113 and executing the control program. The function units will be described below.

The image input unit 210 receives the input of image data conforming to the copy function, the scan-and-transmit function, or the print function of the image forming apparatus 101. For example, if the copy function or the scan-and-transmit function is executed, the image input unit 210 acquires scanned image data from the scanner unit 140. If the print function is executed, the image input unit 210 acquires page description language (PDL) data from the PC 102.

The setting management unit 220 manages various setting values regarding various types of image processing to be executed by the image processing unit 230. Further, the setting management unit 220 also receives, from a UI screen displayed on the operation unit 120, an instruction from the user, acquires a setting value, and performs control to manage the setting value.

The image processing unit 230 performs, on the image data acquired by the image input unit 210, various types of image processing based on the function to be used. The image processing unit 230 includes a scanner image processing unit 231, a printer image processing unit 232, a luminance-density conversion processing unit 233, a gamma processing unit 234, a halftone processing unit 235, a dot addition unit 236, and a format conversion unit 237.

Figure 6:
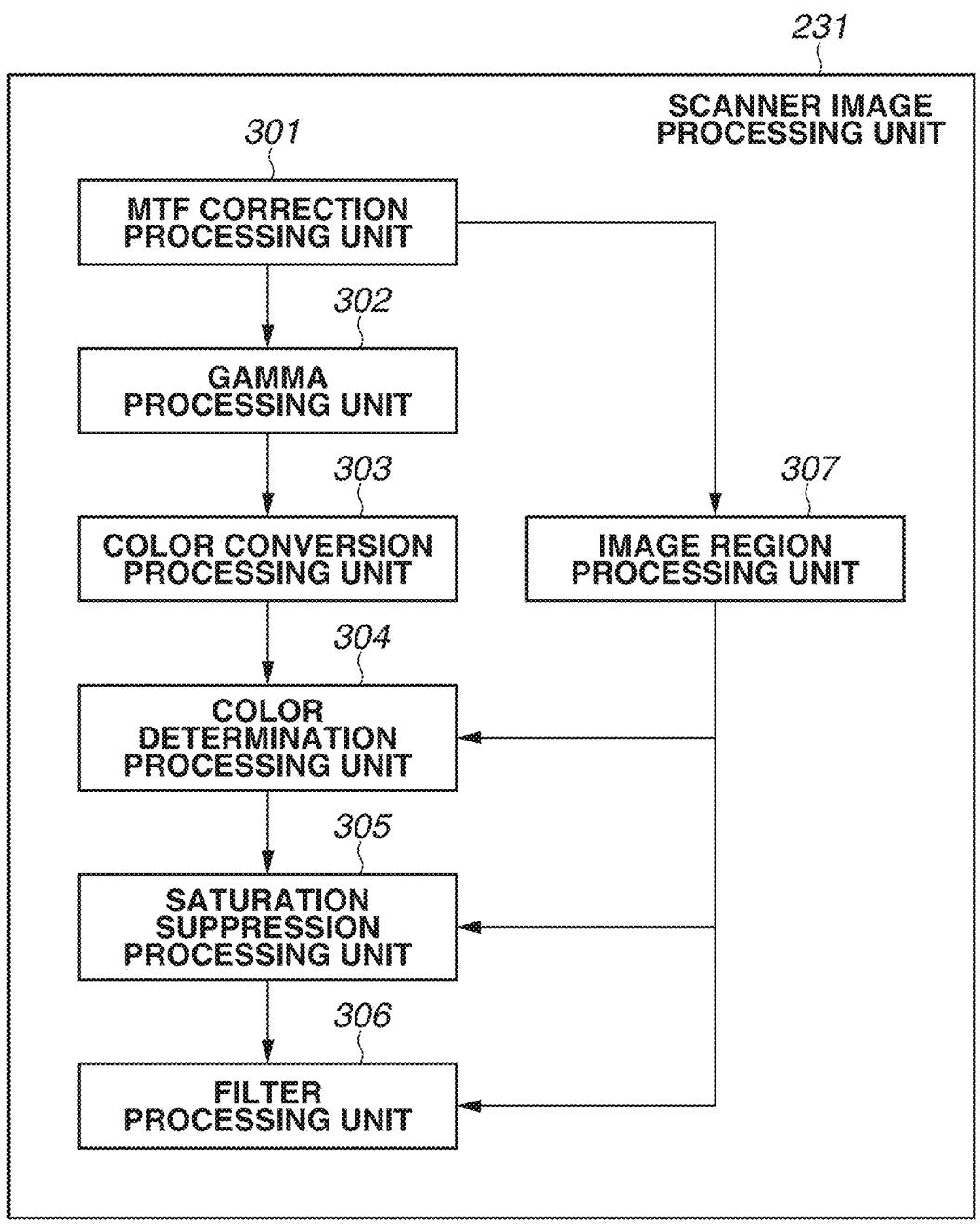
FIG. 6 is a block diagram illustrating an example of a scanner image processing unit.

FIG. 6 is a block diagram illustrating an example of the software configuration of the scanner image processing unit 231 in FIG. 5. In the scanner image processing unit 231, image processing used to execute image processing functions on a scanned image illustrated in FIG. 6 is performed. The scanner image processing unit 231 includes a modulation transfer function (MTF) correction processing unit 301, a gamma processing unit 302, a color conversion processing unit 303, a color determination processing unit 304, a saturation suppression processing unit 305, a filter processing unit 306, and an image region processing unit 307.

The MTF correction processing unit 301 corrects a reading MTF that changes depending on the reading speed. The gamma processing unit 302 performs a one-dimensional gamma process based on the characteristics of a scanner. The color conversion processing unit 303 converts the color space of the scanner to a color space independent of the scanner. The color conversion processing unit 303 also performs the process of removing the specified color according to the present disclosure. The details will be described below with reference to FIG. 11.

Further, the image region processing unit 307 determines an image region, such as text, halftone dots, or a photograph, using an image processed by the MTF correction processing unit 301. Using image region information regarding the image region, the color conversion processing unit 303 performs a color conversion process, the color determination processing unit 304 performs a color determination process, the saturation suppression processing unit 305 performs a saturation suppression process, and the filter processing unit 306 performs a filter process.

Here, the color determination processing unit 304 determines whether the image has a chromatic color or an achromatic color using the image region information. The saturation suppression processing unit 305 corrects the amounts of red, green, and blue (RGB) in the image that has an achromatic color based on the determination according to the image region information. For example, if the color determination processing unit 304 determines that the image has an achromatic color, the saturation suppression processing unit 305 performs the process of equalizing the amounts of RGB. Then, the filter processing unit 306 performs smoothing and edge enhancement based on the image region information.

The print image processing unit 232 performs image processing used to execute the print function, such as the process of interpreting PDL data, thus generating intermediate data, and a raster image processor (RIP) process for converting the intermediate data into data in a bitmap format that can be interpreted by the printer unit 130. The process of generating the above attribute information is also performed in the RIP process.

The luminance-density conversion processing unit 233 performs the process of converting the color space (e.g., RGB) of the data generated by the scanner image processing unit 231 or the print image processing unit 232 to a color space (e.g., cyan, magenta, yellow, and black (CMYK)) supported by the printer unit 130. If the color space of the image data is CMYK when input to the luminance-density conversion processing unit 233, the image data is sent without change to the gamma processing unit 234.

The gamma processing unit 234 performs the process of correcting the density gradations of the printer unit 130 so that the density gradations have characteristics determined in advance.

The halftone processing unit 235 performs the process of converting the gradation value (e.g., 256 gradations) of the input image data into N-valued (e.g., two-valued) image data (halftone image data) having gradations that the printer unit 130 is able to output.

The dot addition unit 236 adds a dot determined in advance. The image output unit 240 outputs the halftone image data as a result of performing the various types of image processing on the input image data to the printer unit 130 via the printer I/F 116.

The format conversion unit 237 converts the data generated by the scanner image processing unit 231 into a versatile format that is transmittable, such as the Joint Photographic Experts Group (JPEG) format or the Portable Document Format (PDF) format.

The image output unit 240 outputs the halftone image data as a result of performing the various types of image processing on the input image data to the printer unit 130 via the printer I/F 116.

The image transmission unit 250 transmits the image data as a result of performing the various types of image processing on the input image data to the PC 102 via the network I/F 118 and the LAN 103.

The processes corresponding to steps S412, S413, and S414 described in FIG. 2, i.e., the processing from the image formation to the image output, will be described in detail.

In the image formation in step S412, the image input unit 210 converts an image read in the scanning in step S411 into an image in a bitmap format that can be handled in the image processing.

In the image processing step S413, the scanned image generated in the image formation in step S412 is acquired in the case of the copy function, and the color conversion processing unit 303 of the scanner image processing unit 231 performs color conversion including the specified color removal process on the scanned image. In this example, the user specifies the selection button 531 with red as the specified color, and thus, the process of removing a red color component from the image read through the scanning is executed. Next, the luminance-density conversion processing unit 233 performs a luminance-density conversion process, the gamma processing unit 234 performs a gamma process, the halftone processing unit 235 performs a halftone process, and the dot addition unit 236 adds a dot.

In the image output in step S414, the image output unit 240 prints the generated image. If the printing is executed, the image forming apparatus 101 outputs a document as a copy result obtained by the printer unit 130 printing the image.

<Method for Specified Color Removal>

Figure 11:
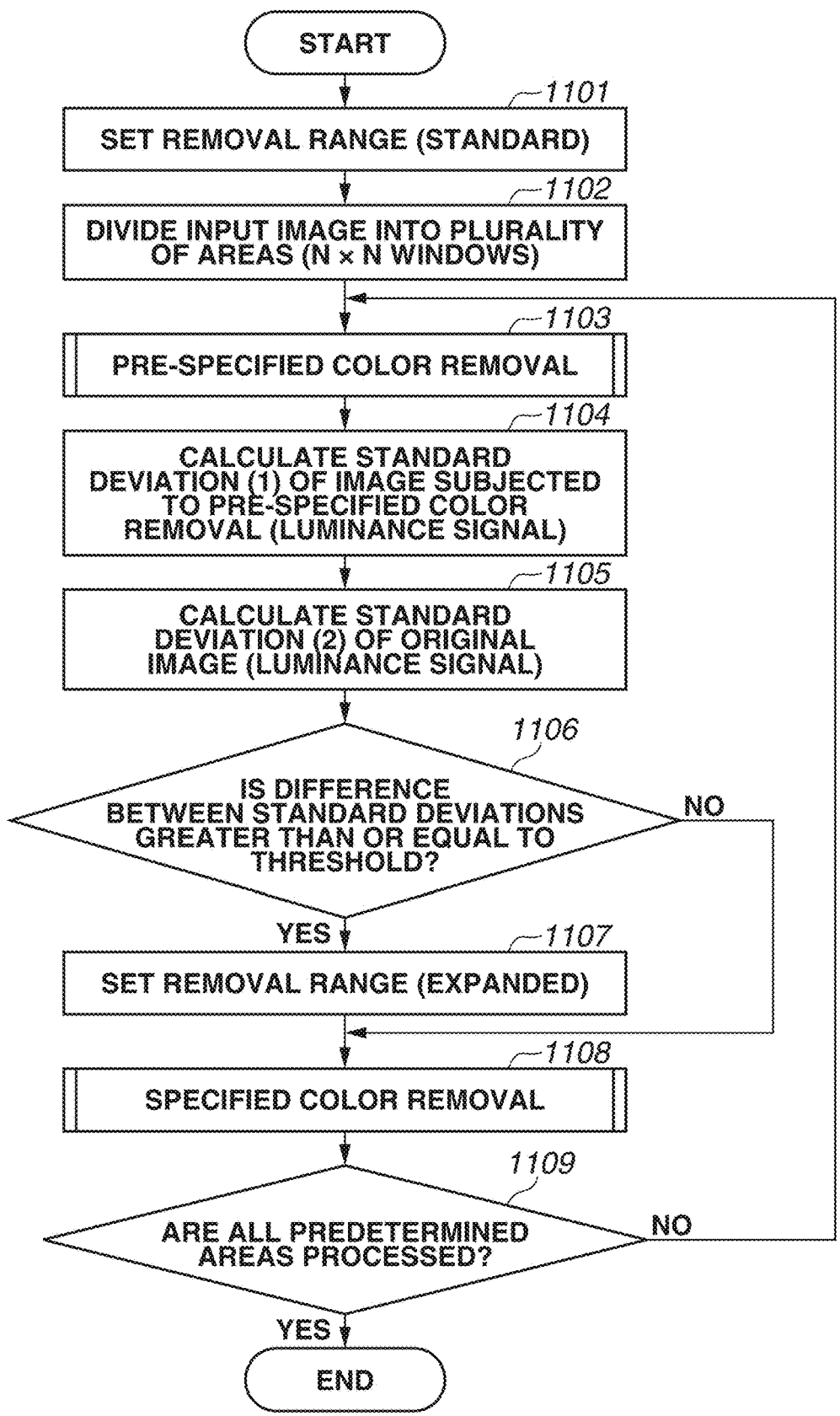
FIG. 11 is a detailed flowchart of a process of performing specified color removal according to a first exemplary embodiment.

FIG. 11 is a diagram illustrating processing of specified color removal according to the first exemplary embodiment of the present disclosure. In the following processing, the processes of steps S1101 to S1109 are implemented by the CPU 111 of the image forming apparatus 101 loading a program stored in the ROM 112 into the RAM 113 and executing the program. The operation unit 120 displays an instruction to the user on the liquid crystal display unit and receives an instruction from the user.

In step S1101, the CPU 111 reads from the ROM 112 a processing parameter to be used to generate a three-dimensional lookup table (LUT) that enables the removal of a specified color component. The CPU 111 then sets the processing parameter in the color conversion processing unit 303. In the exemplary embodiment of the present disclosure, two types of the removal range, namely "standard" and "widen removal range" are selectable. In this case, the CPU 111 reads a processing parameter corresponding to "standard". The details of the input parameter will be described below with reference to FIGS. 10A and 10B.

In step S1102, the CPU 111 divides an input image into a plurality of N×N windows. N corresponds to seven pixels, for example. These N×N windows are obtained as follows. Data outside an end portion is set to 0, and windows are sequentially formed by being shifted from the first pixel to the last pixel in the image with respect to each pixel and each row. The central pixel of each N×N window is a pixel of interest. For the processes of step S1103 and S1105, the CPU 111 stores, in the HDD 114, each of pieces of image data obtained by the input image being divided into the plurality of N x N windows. The processes of the subsequent steps are performed on each of the plurality of divided N×N windows.

In step S1103, the CPU 111 identifies some of the N×N windows included in the input image stored in the HDD 114 for the process of step S1103 and causes the color conversion processing unit 303 to perform pre-specified color removal on the identified N×N windows. These N×N windows are identified from the upper left of the input image. If the processing on the upper left N×N window is completed, an N×N window to the right of the upper left N×N window is identified. If the processing on an N×N window at the right end is completed, the leftmost N×N window among N×N windows one level lower than the upper N×N windows is identified.

The color conversion processing unit 303 is a processing unit that converts RGB signal values dependent on the scanner unit 140 into device-independent R'G'B' signal values, using a three-dimensional LUT. FIG. 7 illustrates an example of the three-dimensional LUT used at this time. The three-dimensional LUT includes a total of 4096 lattice points, for example. At each lattice point, the correspondence relationship between output RGB and input RGB is determined. For example, if the input RGB is (0, 0, 15), the output RGB is converted into (0, 0, 19). If the input RGB does not have values in units of 15, the output is obtained by interpolation calculation between adjacent lattice points. The conversion process using the three-dimensional LUT is performed on each pixel in the input image, thus converting RGB signal values dependent on the scanner unit 140 into device-independent R'G'B' signal values. Specified color removal can be realized by the three-dimensional LUT used by the color conversion processing unit 303 being changed to an LUT for the specified color removal. For example, if RGB signal values on the output side of the three-dimensional LUT correspond to a specified color received by the image forming apparatus 101, the specified color removal can be implemented by the output values of the three-dimensional LUT being converted into white. That is, the specified color can be removed by output RGB signal values corresponding to input RGB signal values regarding the specified color being converted into (255, 255, 255). The three-dimensional LUT may be generated each time based on the setting values of the specified color and the removal range set by the user using the operation unit 120, or a different three-dimensional LUT may be held in advance with respect to each specified color. The details of the method for generating the three-dimensional LUT to be used in the pre-specified color removal will be described below with reference to FIGS. 8A and 8B.

Next, with reference to FIG. 12, a description will be provided of the states and results of the determinations of pre-specified color removal executed on documents (1201 and 1203) each represented by a spot color and a document (1202) represented by a process color. In the following example, a case will be described where "red" 531 is set as the specified color on the advanced setting screen 530 displayed on the operation unit 120. Consequently, the description is given on the assumption that the documents 1201 and 1202 are visually the same red to the user and therefore have expected values indicating that red will be removed in the specified color removal. The document 1203 is yellow and therefore has an expected value indicating that yellow will not be removed in the specified color removal. The document 1201 is represented by red as a spot color. If the red of the document 1201 is indicated on the UV plane, all the pixels are represented by a chromaticity located at red (R) 1204. In this case, all the pixels are located within the removal range of the pre-specified color removal (within a shaded range on the UV plane illustrated in FIG. 12). Thus, the color is removed at all the pixels (an expected value 1209 and a result 1214 match each other). The document 1202 is visually the same red as the document 1201 to the user, but is represented by CMYK process colors. Thus, the pixels include a plurality of different colors. In the example of FIG. 12, a pixel 1211 includes yellow (Y), and a pixel 1210 includes magenta (M). The red of the document 1202 is represented by the area gradations of these two colors. Thus, if the red of the document 1202 is indicated on the UV plane, the pixel 1210 is represented by a chromaticity located at magenta (M) 1206, and the pixel 1211 is represented by a chromaticity located at yellow (Y) 1207 while the visual chromaticity to the user corresponds to one located at red (R) 1205. Thus, even if the specified color removal is executed, the color of the pixel having the chromaticity in yellow (Y) 1207 remains without being removed (an expected value 1212 and a result 1215 do not match each other). The document 1203 is represented by yellow as a spot color. If the yellow of the document 1203 is indicated on the UV plane, all the pixels are represented by a chromaticity located at yellow (Y) 1208. In this case, all the pixels are located outside the removal range of the pre-specified color removal (outside the shaded range on the UV plane illustrated in FIG. 12). Thus, the color is not removed (an expected value 1213 and a result 1216 match each other).

Next, in step S1104, the CPU 111 converts an RGB image of each N×N window subjected to the pre-specified color removal in step S1103 into a YUV image. Conversion formulas from RGB to YUV to be used at this time are, for example, as follows:

$$Yi = 0.299 \times Ri + 0.587 \times Gi + 0.114 \times Bi,$$

$$Ui = 0.169 \times Ri - 0.331 \times Gi + 0.50 \times Bi,$$

$$Vi = 0.50 \times Ri - 0.419 \times Gi - 0.081 \times Bi,$$

where i is a pixel number in the N×N window.

Further, a standard deviation δ (hereinafter referred to as a "standard deviation (1)") as the feature amount of the image is calculated using the Y-component of the YUV image, and saved in the RAM 113. The standard deviation (1) is calculated by the following calculation formula.

$$\sigma = \sqrt{\Sigma_{i=1}^{N}(Y_{i-\mu})^2/N}, \text{ where} \quad (1)$$

Yi: the luminance value of an i-th pixel in the N×N window, μ: the average luminance value in the N×N window, and N: the total number of pixels in the N×N window.

Instead of the standard deviation (1), a dispersion may be used.

Next, in step S1105, the CPU 111 acquires the input image stored in the HDD 114 for the process of step S1105. The CPU 111 converts the RGB images of the same N×N windows as the N×N windows identified in step S1103 among the plurality of N×N windows in the input image into YUV images. Further, as conversion formulas from RGB to YUV to be used at this time, the same conversion formulas as those in step S1104 are used. Further, a standard deviation (hereinafter referred to as a "standard deviation (2)") as the feature amount of the image is calculated using the Y-component of the YUV image, and saved in the RAM 113. The standard deviation (2) may be calculated using or similarly to step S1104.

Next, in step S1106, the CPU 111 determines whether the difference between the standard deviations (1) and (2) saved in the RAM 113 is greater than or equal to a threshold determined in advance. If the determination is YES (YES in step S1106), the processing proceeds to step S1107. If the determination is NO (NO in step S1106), the processing proceeds to step S1108.

Figures 13A, 13B:
FIGS. 13A and 13B is an image diagram illustrating an example of the specified color removal process according to the first exemplary embodiment.

With reference to FIG. 13A, a description will be provided of standard deviations (1) and (2) calculated for documents (1301 and 1303) each represented by a spot color and a document (1302) represented by a process color, and determination results. In FIG. 13A, the description will be provided using as an example a case where the threshold is set to 20. Since the document 1301 (the same as the document 1201 illustrated in FIG. 12) is represented by red as a spot color, a variation in the luminance values (the Y-component) of pixels in the document 1301 is small, and the standard deviation (2) before the specified color removal is small (1.677 in the example). After the specified color removal, the color is removed, and each pixel is converted into white. Thus, the standard deviation (1) after the specified color removal is 0. Thus, the difference between the standard deviations (1) and (2) is less than the threshold (e.g., less than 20) (−1.67 in the example). Thus, the determination is NO, and the processing proceeds to step S1108.

The document 1302 (the same as the document 1202 illustrated in FIG. 12) is represented by CMYK process colors and is visually the same red as the document 1301 to the user. The pixels, however, include a plurality of different colors. Thus, a variation in the luminance values (the Y-component) of pixels in the document 1302 is great, and the standard deviation before the specified color removal (the standard deviation (2)) is great (11.37 in the example). After the specified color removal, the pixels are divided into pixels where the color is not removed, and pixels where the color is removed. Thus, the standard deviation after the specified color removal (the standard deviation (1)) is greater than the standard deviation before the specified color removal (45.14 in the example). Thus, the difference between the standard deviations (1) and (2) is greater than the threshold (e.g., 20) (33.77 in the example). Thus, the determination is YES, and the processing proceeds to step S1107.

Since the document 1303 (the same as the document 1203 illustrated in FIG. 12) is represented by yellow as a spot color, a variation in the luminance values (the Y-component) of pixels in the document 1303 is small, and the standard deviation before the specified color removal (the standard deviation (2)) is small (1.82 in the example). Also after the specified color removal, the color is not removed in the document 1303. Thus, the standard deviation after the specified color removal (the standard deviation (1)) is the same as the standard deviation (2) (1.82 in the example). Thus, the difference between the standard deviations (1) and (2) is smaller than the threshold (e.g., 20) (0 in the example). Thus, the determination is NO, and the processing proceeds to step S1108.

In the above example, a case has been described where the threshold is uniformly set to 20, regardless of the specified color. The brightness, however, differs according to the specified color. For example, red and green have higher brightness than blue and black, and even if the color of red or green somewhat remains, it is difficult for the user to visually recognize the color. Thus, the threshold for the feature amount may be allowed to be set and changed separately with respect to each specified color. The user may be allowed to set the threshold based on the specified color independently and separately with respect to each specified color through the operation unit 120.

Next, in step S1107, the CPU 111 reads from the ROM 112 a processing parameter to be used for generating a three-dimensional LUT that enables the removal of the specified color component. The CPU 111 sets the processing parameter in the color conversion processing unit 303 again. The processing parameter to be read at this time is a parameter corresponding to "widen removal range". The details of the input parameter will be described below with reference to FIGS. 10A and 10B.

In the first exemplary embodiment, a configuration is employed in which an issue is solved by the removal range of the specified color removal. As another configuration, a configuration is possible in which an adaptive smoothing process is performed in step S1107. The adaptive smoothing process is a digital filter process for smoothing a desired frequency component of image data while excluding text and a thin line. Typical examples of a filter used in the digital filter process include a bilateral filter. This process smooths a halftone dot portion of a document, and the periodic structure of halftone dots disappears. Thus, without changing the removal range of the specified color removal, it is possible to solve the issue that the color remains without being removed on the document.

Next, in step S1108, the CPU 111 causes the color conversion processing unit 303 to perform the specified color removal. The method for the specified color removal is like the process described in step S1103.

With reference to FIG. 13B, a description will be provided of the states and the results of the determinations of specified color removal executed on the documents (1301 and 1303) each represented by a spot color and the document (1302) represented by process colors. In the following example, a case will be described where "red" 531 is set as the specified color on the advanced setting screen 530 displayed on the operation unit 120, as in step S1103. Consequently, the description is given on the assumption that the documents 1301 and 1302 are visually the same red to the user and therefore have expected values indicating that red will be removed by the specified color removal. The document 1303 is yellow and therefore has an expected value indicating that yellow will not be removed in the specified color removal.

The document 1301 (the same as the document 1201 illustrated in FIG. 12) is represented by red as a spot color. If the red of the document 1301 is indicated on the UV plane, all the pixels are represented by a chromaticity located at red (R) 1304. The specified color removal is executed on the document 1301 with the removal range (standard) set in step S1101 without change, based on the determination result in step S1106. Thus, a result of the specified color removal is the same as the result of the pre-specified color removal in step S1103. Thus, the color is removed at all the pixels (an expected value 1309 and a result 1312 match each other).

The document 1302 (the same as the document 1202 illustrated in FIG. 12) is visually the same red as the document 1301 to the user, but is represented by CMYK process colors. Thus, the pixels includes a plurality of different colors. In the example of FIG. 13B, a pixel 1316 includes yellow (Y), and a pixel 1315 includes magenta (M). The red of the document 1302 is represented by the area gradations of these two colors. Thus, if the red of the document 1302 is indicated on the UV plane, the color is located at red (R) 1305 visually to the user. However, the pixel 1315 is represented by a chromaticity located at magenta (M) 1306, and the pixel 1316 is represented by a chromaticity located at yellow (Y) 1307. The document 1302 is subjected to the specified color removal in the state where the removal range (expanded) is set in step S1107 based on the determination result in step S1106. Thus, the removal range (a shaded range on the UV plane illustrated in FIG. 13B) is wider than that of the pre-specified color removal executed in step S1103. Thus, the removal range corresponds to both magenta (M) 1306 and yellow (Y) 1307. Thus, the color is removed at all the pixels (an expected value 1310 and a result 1313 match each other).

The document 1303 (the same as the document 1203 illustrated in FIG. 12) is represented by yellow as a spot color. If the yellow of the document 1303 is indicated on the UV plane, all the pixels are represented by a color located at yellow (Y) 1308. The specified color removal is executed on the document 1303 with the removal range (standard) set in step S1101 as it is based on the determination result in step S1106. Thus, the result of the specified color removal is the same as the result of the pre-specified color removal in step S1103, so that the color is not removed at all the pixels (an expected value 1311 and a result 1314 match each other).

Next, in step S1109, the CPU 111 determines whether all the images of the N x N windows clipped in step S1102 are processed. If the determination is YES (YES in step S1109), the processing ends. If the determination is NO (NO in step S1109), the processing returns to step S1103. In step S1103, the processing is performed on images of the next N×N windows.

<Method for Generating Three-Dimensional LUT for Specified Color Removal>

Figure 8A:
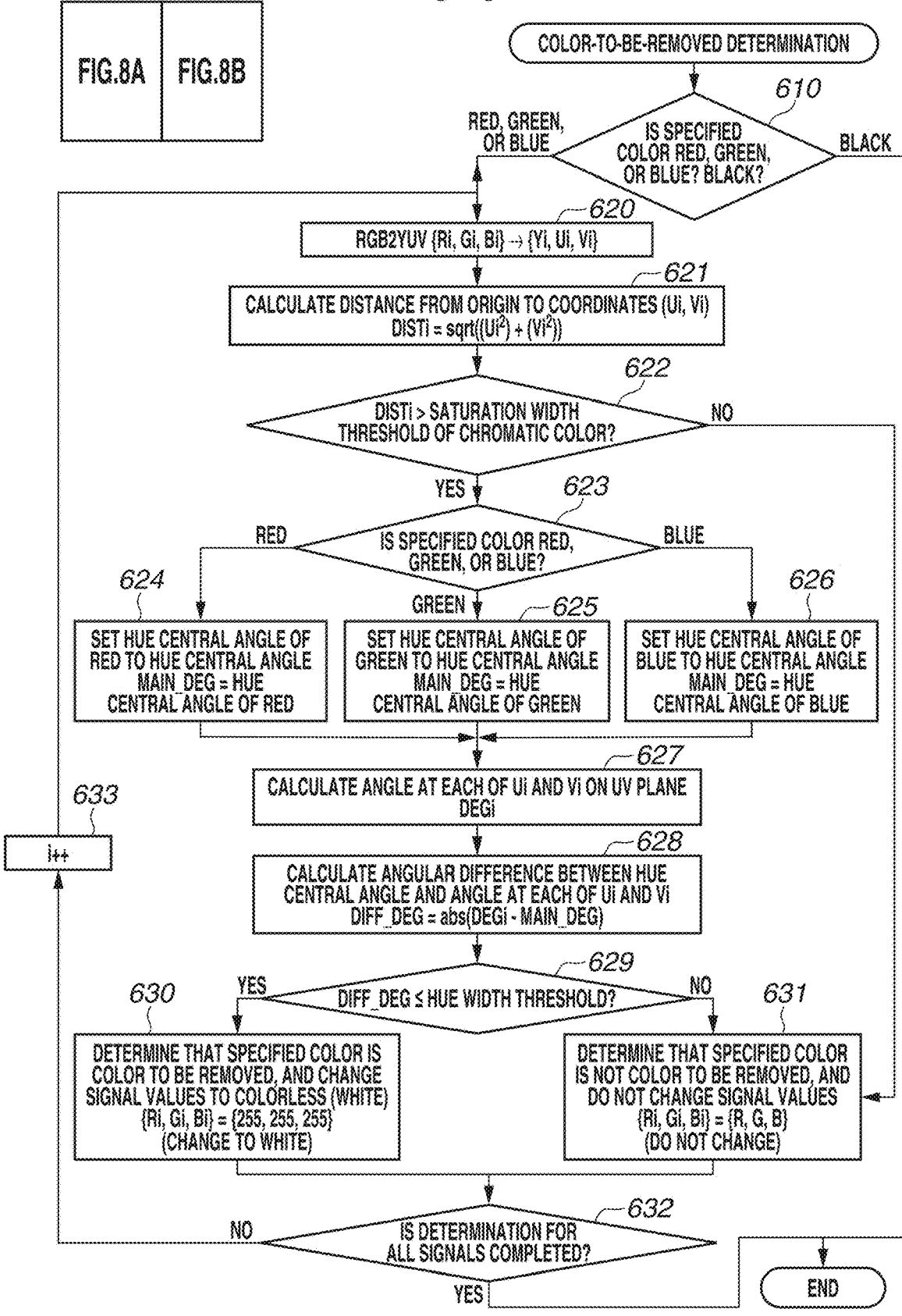
FIG. 8, composed of FIGS. 8A and 8B, is a detailed flowchart of a process of performing the specified color removal.
Figure 8B:
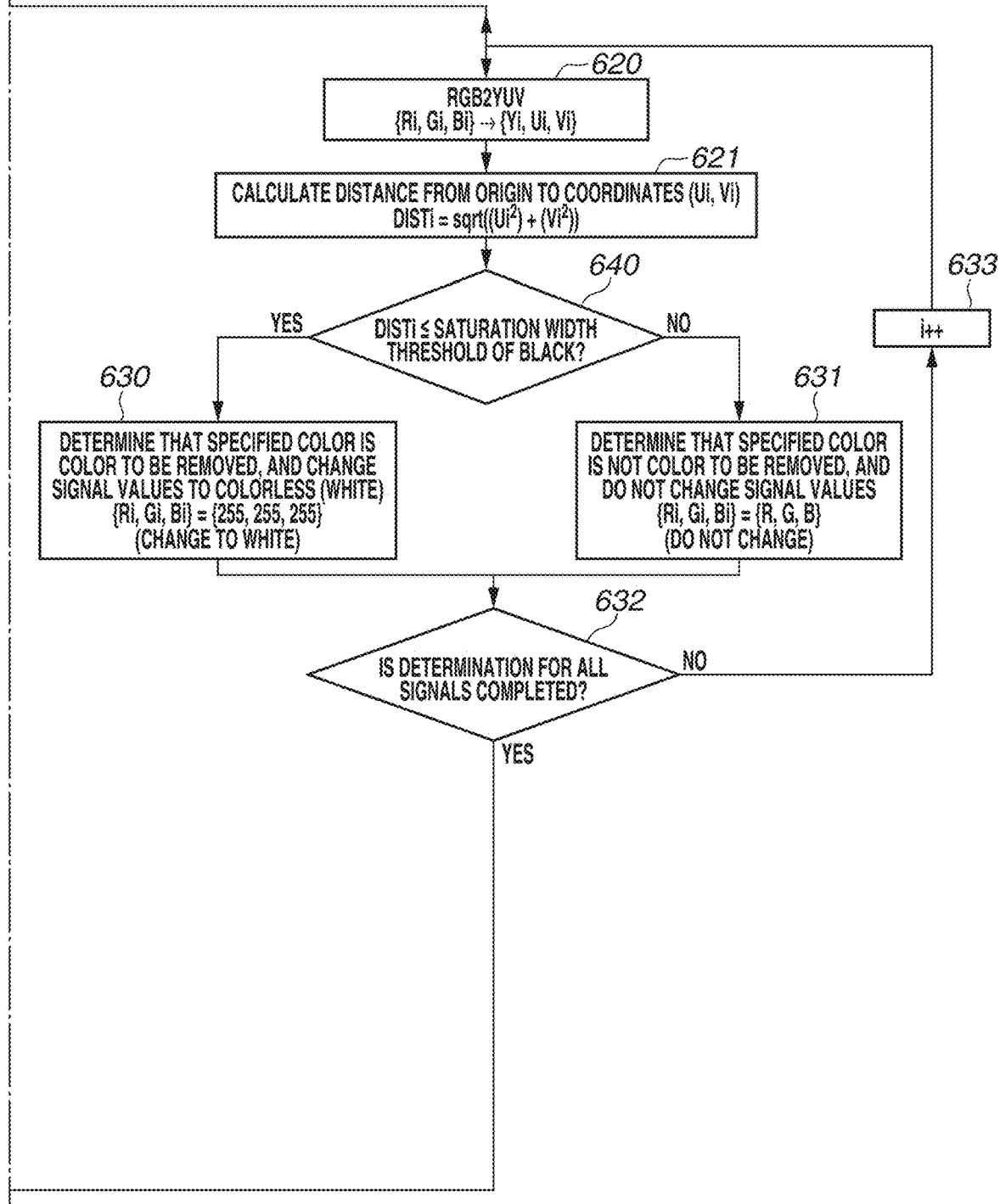

FIGS. 8A and 8B illustrate processing in which the three-dimensional LUT that enables the removal of the specified color component received by the image forming apparatus 101 is calculated. This processing is performed by the color conversion processing unit 303 and implemented by the CPU 111 of the image forming apparatus 101 executing a control program.

Data to be input is R, G, and B on the output side of the three-dimensional LUT, and signal values for all the tables (16×16×16 tables because each LUT has values in units of 15 in the present exemplary embodiment) are processed. Additionally, the saturation width threshold, the hue central angle, and the hue width threshold of each specified color are input as processing parameters. The three-dimensional LUT for performing processing and the input parameters to be used in processing are saved in the ROM 112 and input via the setting management unit 220 in step S610. The input parameters will be described below.

In step S610, it is determined whether the specified color received by the image forming apparatus 101 is a chromatic color, such as red, green, or blue, or is an achromatic color, such as black.

First, a description will be provided of the processing for a case where the specified color is any of red, green, and blue.

In step S620, if the specified color is any of red, green, and blue, input Ri, Gi, and Bi are converted from the RGB color space to a luminance-color difference color space (e.g., the YUV color space). The RGB is converted to YUV with the following formulas:

$$Yi=0.299 \times Ri+0.587 \times Gi+0.114 \times Bi,$$

$$Ui=-0.169 \times Ri-0.331 \times Gi+0.50 \times Bi,$$

$$Vi=0.50 \times Ri-0.419 \times Gi-0.081 \times Bi,$$

where i indicates the LUT number of an LUT that is being used for the processing among all the tables.

In step S621, the distance from the origin (0, 0) to coordinates (Ui, Vi) is calculated based on converted color difference signals (Ui and Vi among Ui, Yi, and Vi). As the calculation formula, for example, the following formula is used.

$$DISTi=sqrt(Ui \times Ui)+(Vi \times Vi))$$

The value calculated at this time is referred to as a "saturation value".

In step S622, it is determined whether the calculated saturation value indicates saturation higher or lower than a predetermined threshold (a saturation width threshold). The saturation width threshold is preset and held as a parameter in the ROM 112, and the determination is made using the value of the saturation width threshold. The saturation width threshold may have a value that differs with respect to each specified color. If the calculated saturation value is higher than the saturation width threshold (indicates higher saturation) (YES in step S622), the processing proceeds to step S623. If the calculated saturation value is lower than the saturation width threshold (indicates lower saturation) (NO in step S622), the processing proceeds to step S631.

Figure 9A:
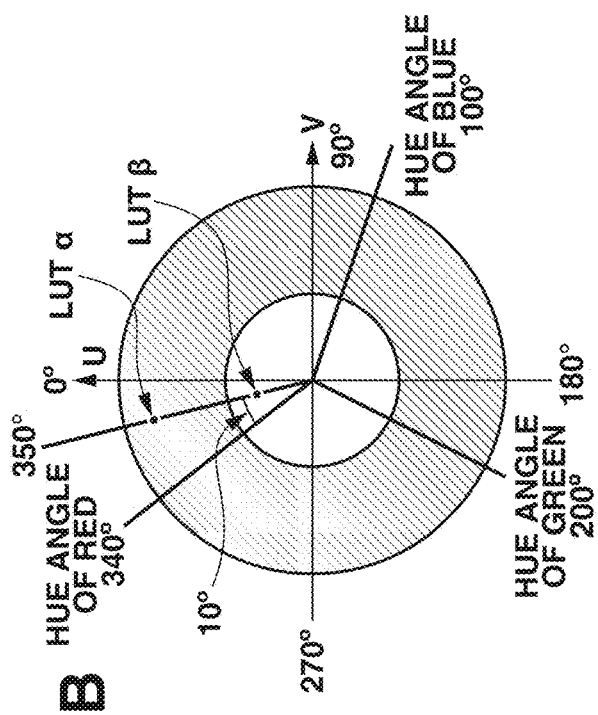
FIGS. 9A, 9B, 9C, and 9D are diagrams each illustrating an example where the specified color is removed.

At this time, if the saturation value of the input signal values is on the lower saturation side of the saturation width threshold, it is determined that the specified color is not to be removed. If the saturation value is on the higher saturation side of the saturation width threshold, the specified color is set as a removal candidate. The color having lower saturation is set so as not to be removed here, and it is possible to prevent a color close to an achromatic color from being removed. FIGS. 9A, 9B, 9C, and 9D illustrate a hue circle on a color difference space plane. If a shaded patch region in FIG. 9A is a removal candidate, and an LUT to be input can be plotted at the point of an LUT α, the specified color is set as a removal candidate. If the LUT can be plotted at the point of an LUT β, the specified color is not to be removed.

In step S623, the processing branches based on which color of red, green, and blue the specified color received by the image forming apparatus 101 is. If the specified color received by the image forming apparatus 101 is red, the processing proceeds to step S624. If the specified color received by the image forming apparatus 101 is green, the processing proceeds to step S625. If the specified color received by the image forming apparatus 101 is blue, the processing proceeds to step S626.

Figure 9B:
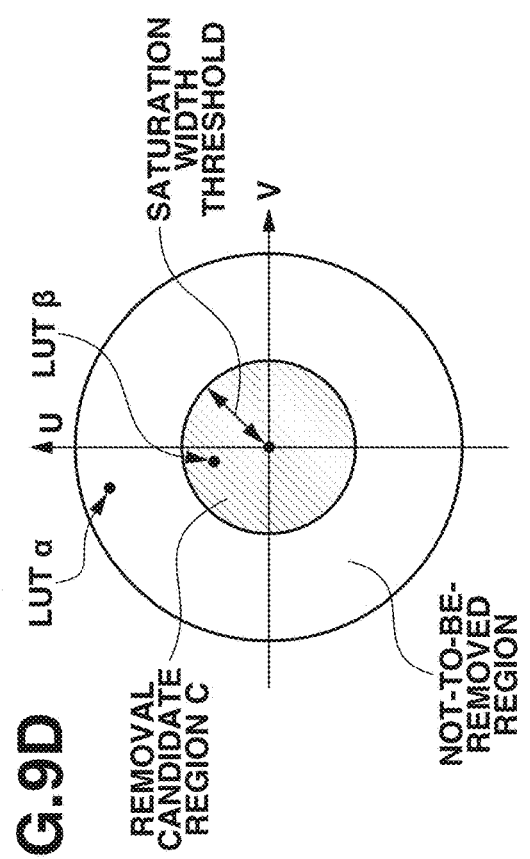

In step S624, S625, or S626, the hue central angle on the UV plane as a reference for the specified color among R, G, and B is set. As illustrated in FIG. 9B, in a clockwise range from 0° on the apex side to 359° about the origin on the UV plane, a hue angle as a reference for each color is preset and held as a parameter, and the value of the hue angle is used. For example, as illustrated in FIG. 9B, values are set such that the hue central angle of red is 340°, the hue central angle of green is 200°, and the hue central angle of blue is 100°.

In step S627, the angle on the UV plane (a UV hue angle) is calculated based on the converted color difference signals (Ui and Vi among Ui, Vi, and Yi). In the example of FIG. 9B, an angle of 350° is calculated at both the LUTs α and β.

In step S628, the angular difference (the hue angular difference) between the hue angle as a reference set in step S624, S625, or S626 and the UV hue angle at each LUT calculated from the converted color difference signals in step S627 is calculated with the following formula:

$$\text{DIFF\_DEG} = |(\text{UV hue angle of each LUT}) - (\text{hue angle as reference})|.$$

For example, if the specified color received by the image forming apparatus 101 is red, the angular difference between the value set in step S624 and the value calculated in step S627 is calculated. If the specified color received by the image forming apparatus 101 is red, the hue angle value as a reference set in step S624 is 340°. Since the UV hue angle calculated in step S627 is 350° at both the LUTs α and β, the hue angular difference is 10° at both the LUTs α and β.

Figure 9C:
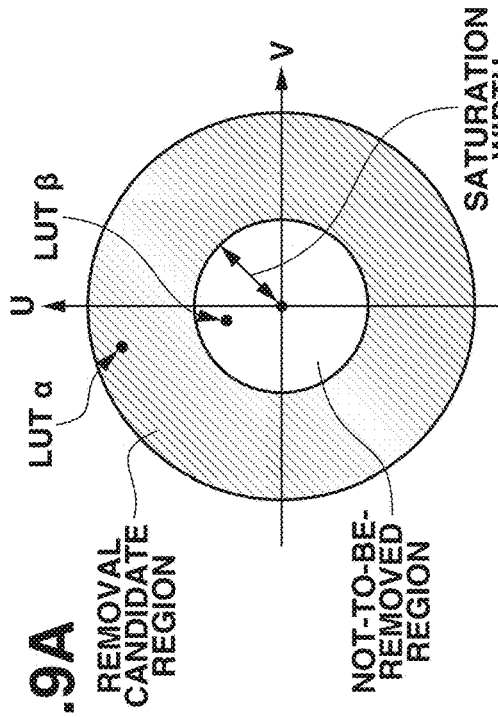

In step S629, it is determined whether the hue angular difference calculated in step S628 exceeds the hue width threshold of each color. If the hue angular difference is less than or equal to the hue width threshold (YES in step S629), the processing proceeds to step S630. If the hue angular difference is greater than the hue width threshold (NO in step S629), the processing proceeds to step S631. In FIG. 9C, it is determined whether the hue angle is included within a region corresponding to the hue width threshold in both directions about the hue central angle of red. For example, if the hue width threshold is 30 degrees, points included in a hue angle of 340° of red plus or minus a hue width threshold of 30° are set as the removal range. Thus, a color gamut in a hue angle from 340°−30° (=310°) to 340°+30° (=370° (=10°)) is removed.

In step S630, RGB values at the LUT that are to be removed based on the determination in step S629 are changed to signal values that are not to be printed. For example, in the case of luminance signal values, the values are changed to values of (R, G, B)=(255, 255, 255) indicating white.

In step S631, RGB values at the LUT for which it is determined that the removal is not to be performed in step S629 are not changed, and are maintained as input signals.

In step S632, it is determined whether the determinations for all the LUTs are completed. If the determinations for all the signals are not completed (NO in step S632), then in step S633, i is incremented to process the next LUT. The processes of step S620 and the subsequent processes are performed. Since all the LUTs described in the present exemplary embodiment have values in units of 15, the description will be provided using 16×16×16 tables as examples. If the determinations for all the signals are completed (YES in step S632), the processing ends.

Next, a description will be provided of the processing in a case where the specified color is black.

Steps S620 and S621 are like those described above, and thus are not described here.

In step S640, it is determined whether the calculated saturation value indicates saturation higher or lower than the predetermined threshold (the saturation width threshold). The saturation width threshold is preset and held as a parameter in the ROM 112, and the determination is made using the value of the saturation width threshold. In the determination method, if the calculated saturation value is lower than the saturation width threshold (indicates lower saturation) (YES in step S640), the processing proceeds to step S630. If the calculated saturation value is higher than the saturation width threshold (indicates higher saturation) (NO in step S640), the processing proceeds to step S631.

Figure 9D:
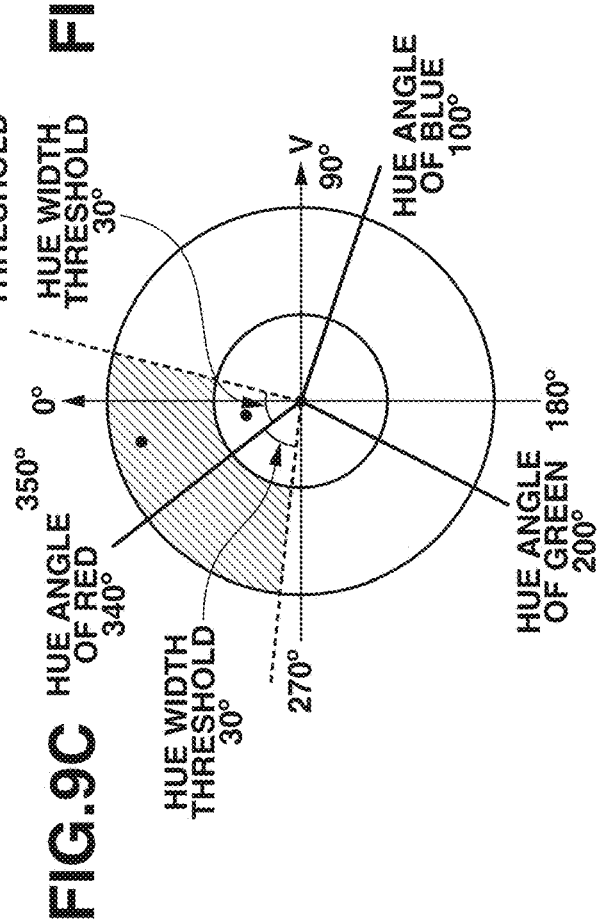

At this time, if the saturation value of the input signal values is on the higher saturation side of the saturation width threshold, it is determined that the specified color is not to be removed. If, on the other hand, the saturation value is on the lower saturation side of the saturation width threshold, it is determined that the specified color is to be removed. Here, the color having higher saturation is set so as not to be removed, and it is possible to prevent a color close to a chromatic color from being removed. If a shaded patch region in FIG. 9D is a removal range, and an LUT to be input can be plotted at the point of the LUT α, the specified color is not to be removed. If the LUT can be plotted at the point of the LUT β, the specified color is in the removal range.

Steps S630, S631, S632, and S633 are like those described above, and thus are not described here.

Through the above processing, it is possible to rewrite a three-dimensional LUT to be input to an LUT that enables the removal of a specified color received by the image forming apparatus 101, based on the specified color.

<Parameters to Be Used in Specified Color Removal Process>

As described above, in the generation of the three-dimensional LUT, in addition to an RGB table on the output columns of the three-dimensional LUT, the saturation width threshold, the hue central angle, and the hue width threshold of each specified color are input as processing parameters. A description will be provided of the parameters to be used in processing and parameters that can be changed in the applied settings by the user. The input parameters to be used in processing are saved in the ROM 112 and input via the setting management unit 220 in step S610.

The parameters can be changed, and may be configured to be directly specified through a UI. In the present exemplary embodiment, a description will be provided of a configuration in which a parameter to be used is switched with a preset value by the user specifying the parameter.

FIG. 10A illustrates the reference values of the saturation width threshold, the hue central angle, and the hue width threshold when each color is specified. In the specified color removal setting instruction in step S406, the values switch with respect to each specified color received by the image forming apparatus 101. The values in a case where the applied settings are not made are default values and indicate the saturation width threshold, the hue central angle, and the hue width threshold when each of red, green, blue, and black is specified. The values of the saturation width threshold, the hue central angle, and the hue width threshold can be changed with respect to each specified color. The saturation width threshold is held with respect to each specified color, but the hue central angle and the hue width threshold are parameters to be used only when red, green, or blue is specified, and therefore are not held.

FIG. 10A illustrates, in "mode of widening removal range", examples of parameters when the "widen removal range" button 535 is specified in the specified color removal advanced setting instruction in step S408. Values are held that enable the removal of each specified color in a wider range than the default values. The saturation width threshold when each of red, green, and blue is specified is set to a value further on the achromatic color side than the default value, and the resultant serves as a coefficient that enables the removal of the specified color further on the achromatic color side. The saturation width threshold when black is specified is set to a value further on the chromatic color side than the default value, and the resultant serves as a coefficient that enables the removal of the specified color further on the chromatic color side. The hue width threshold when each of red, green, and blue is specified is set to a wider hue than that of the default value, and the resultant serving as a coefficient that enables the removal of the specified color further on a different hue side. The hue central angle does not change from the default value. Regarding these parameters described here, the saturation width threshold is used in the processes of steps S622 and S640, the hue central angle is used in the processes of steps S624, S625, and S626, and the hue width threshold is used in the process of step S629.

In the present exemplary embodiment, a description has been provided of a method for specifying a color formed by a mixture of two or more colors among red, blue, and green and removing the specified color. Alternatively, a color formed by a single color such as cyan, magenta, or yellow can also be removed. In a document formed by a single color, the color is not misregistered when the document is printed. Thus, a configuration can also be employed in which the saturation width threshold is changed while the same value as the default value is used for the hue width threshold. As described above, each threshold can also be changed according to the specified color.

FIG. 10B illustrates examples of parameters when the "tint adjustment" button 536 is specified in the specified color removal advanced setting instruction in step S408. The hue central angle is changed from the default value. For example, if the specified color is red, the hue central angle can be changed at some levels to closer to magenta or closer to yellow from the default hue central angle. As a method for specifying the hue central angle by the user, the user can set the hue central angle on the UI in FIG. 3E. Regarding the above parameter, the hue central angle is used in the processes of steps S624, S625, and S626.

The "widen removal range" button 535 and the "tint adjustment" button 536 enable adjustments independently of each other. Only either one of the adjustments can be specified, or both the adjustments can be executed together.

In the present exemplary embodiment, a description has been given of a configuration in which a setting value is switched in a range having some levels in a UI, and a preset parameter value is used. Alternatively, a configuration may be employed in which a UI is prepared that enables the user to directly change a parameter, and the user is enabled to directly adjust a parameter value.

In the present exemplary embodiment, the processing of the copy function has been described. The present exemplary embodiment, however, can be performed for not only the copy function but also any functions by the color conversion processing unit 303 of the scanner image processing unit 231 performing the processing as described above. The present exemplary embodiment can also be applied to any functions using a scanning process, such as a scan-and-transmit function for transmitting a scanned image to the PC 102, a scan-and-save function for saving a scanned image in the image forming apparatus 101, or a fax transmission function.

The CPU 111 can cause the printer unit 130 to execute printing based on image data in which a specified color is removed with the method according to the first exemplary embodiment. The CPU 111 can transmit image data in which a specified color is removed with a method according to the first exemplary embodiment to an external apparatus, such as the PC 102 via the network I/F 118.

As described above, according to the present exemplary embodiment, a configuration is employed in which it is determined whether the feature amount (the standard deviation of the luminance in the present exemplary embodiment) of an image changes before and after specified color removal. Only if the feature amount changes, the removal range of the specified color removal is widened. Consequently, even if the specified color removal is executed on a document represented by CMYK process colors, it is possible to prevent the color from remaining without being removed. It is determined whether to expand the range where the specified color is to be removed for each area, it is possible to prevent even a color that the user does not wish to remove from being removed.

A second exemplary embodiment of the present disclosure will be described below. In the first exemplary embodiment, a configuration is employed in which it is determined whether the feature amount (e.g., the standard deviation of the luminance) of an image changes before and after specified color removal. Only if the feature amount changes, the removal range of the specified color removal is widened. This solves the issue that the color remains without being removed depending on the document.

In the first exemplary embodiment, the color conversion processing unit 303 calculates the feature amount before and after the specified color removal process. Accordingly, the specified color removal is executed twice (preprocessing for calculating the feature amount and main processing). In a second exemplary embodiment, focusing on this point, a description will be provided of processing of extracting a halftone dot region in an input image and changing the removal range of the specified color removal between the halftone dot region and a region other than the halftone dot region, thus preventing the color from remaining without being removed depending on the document.

A hardware configuration diagram of the image forming apparatus 101 according to the second exemplary embodiment is like that according to the first exemplary embodiment, and thus is not described here. An example of a sequence diagram illustrating the interaction between the user and the image forming apparatus 101 according to the second exemplary embodiment is like that according to the first exemplary embodiment, and thus is not described here. A block diagram illustrating an example of processing executed by the image forming apparatus 101 according to the second exemplary embodiment is like that according to the first exemplary embodiment, and thus is not described here. A block diagram illustrating an example of the scanner image processing unit 231 according to the second exemplary embodiment is like that according to the first exemplary embodiment, and thus is not described here.

<Description of Image Area Separation Process>

Figure 14:
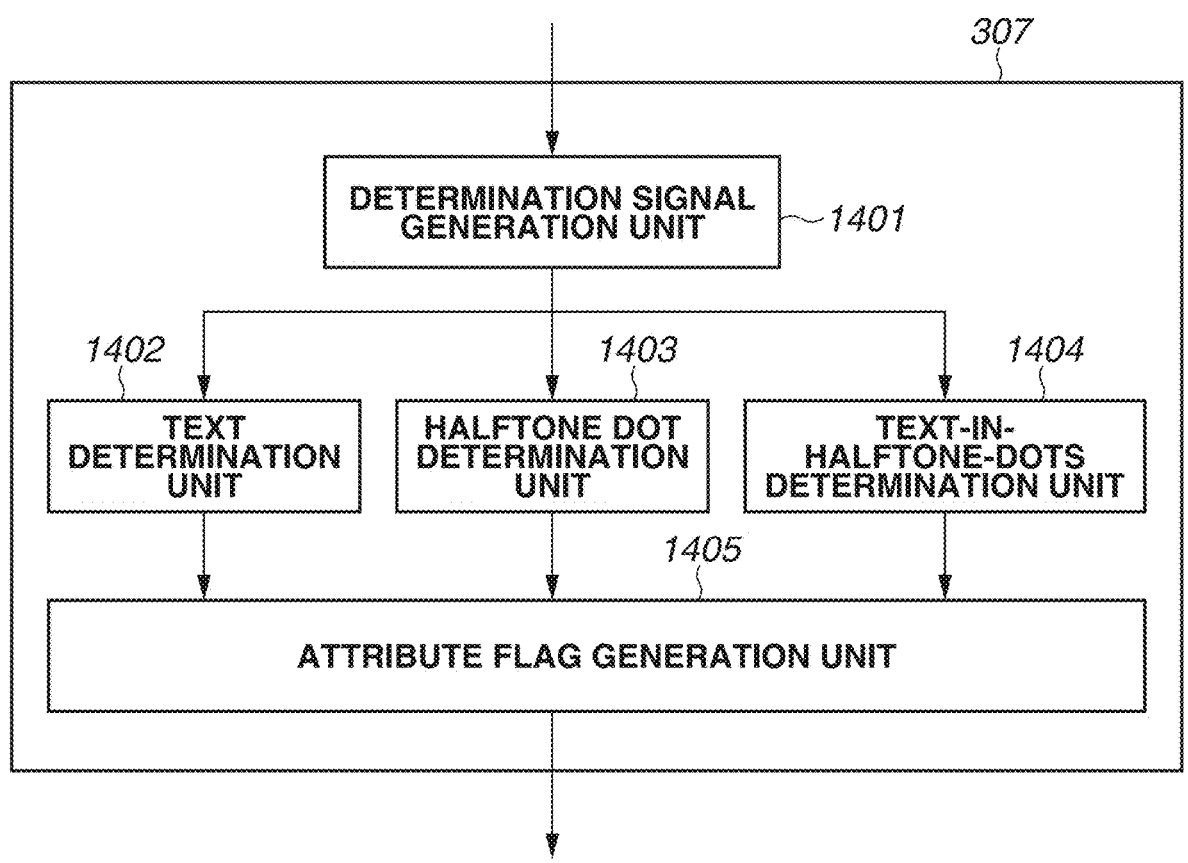
FIG. 14 is a block diagram illustrating an example of an image area separation processing unit.

FIG. 14 is a diagram illustrating the block configuration of an image area separation processing unit 307 according to the second exemplary embodiment.

A determination signal generation unit 1401 generates a determination signal (data) for determining an attribute with respect to each pixel unit using an input image. For example, if input signals are RGB signals (8 bits for each signal), the determination signal generation unit 1401 generates grayscale signals (8 bits). At this time, the determination signal generation unit 1401 may extract only the G-channel from RGB, or obtain the grayscale signals through calculation, such as (R+2×G+B)/4. In some cases, the determination signal generation unit 1401 may convert the RGB color space to the Lab color space and use L-data about the Lab color space. That is, the number of channels and the number of bits of the input signals are not limited to these. The determination signal generation method, the number of channels, and the number of bits described above are also merely examples. The determination signal (luminance data) generated by the determination signal generation unit 1401 is supplied to a text determination unit 1402, a halftone dot determination unit 1403, and a text-in-halftone-dots determination unit 1404. The text determination unit 1402 determines text, the halftone dot determination unit 1403 determines halftone dots, and the text-in-halftone-dots determination unit 1404 determines text in halftone dots.

Initially, the text determination unit 1402 performs an edge enhancement process on the determination signal from the determination signal generation unit 1401. This edge enhancement process is a digital filter process for enhancing and extracting a desired frequency component of the luminance data. Typical examples of a filter used in the digital filter process include a second derivative filter, such as a Laplacian filter. If the second derivative filter is used, a positive or negative sign occurs in a value after the filter process. Next, using thresholds determined in advance (two types, namely positive and negative values), if the value exceeds the positive threshold, the text determination unit 1402 determines that the value is an inside-edge signal (a signal indicating that a pixel of interest is inside the edge of text). If the value falls below the negative threshold, the text determination unit 1402 determines that the value is an outside-edge signal (a signal indicating that the pixel of interest is outside the edge of text). Further, the text determination unit 1402 integrates, for each of the inside-edge signal and the outside-edge signal, pixels in an N×N region (e.g., a 3×3 region) including the pixel of interest, and compares the resulting values with thresholds determined in advance, thus determining an inside-edge area integration determination signal and an outside-edge area integration determination signal. For example, if a value of "2" is set as each threshold, and it is determined that two or more pixels are inside the edge in the 3×3 area near the pixel of interest, a determination signal 1 is output. Similarly, if it is determined that two or more pixels are outside the edge in the 3×3 area near the pixel of interest, the determination signal 1 is output. Finally, using the above three types of determination results (the inside-edge signal, the inside-edge area integration determination, and the outside-edge area integration determination), the text determination unit 1402 obtains a text determination result. As the calculation method, the text determination unit 1402 holds in advance a table in which the above three types of determination results and the text determination result are associated with each other, and calculates the text determination result by referencing this table.

As with the text determination unit 1402, the halftone dot determination unit 1403 performs an edge enhancement process on the determination signal from the determination signal generation unit 1401 and determines an inside-edge signal and an outside-edge signal using thresholds determined in advance. Next, the halftone dot determination unit 1403 performs a pattern matching process on each of the inside-edge signal and the outside-edge signal, thus obtaining an isolation amount determination signal. There are halftone dot documents having low lines per inch and high lines per inch. Thus, the size of halftone dots and the space between halftone dots differ depending on the document. Thus, the pattern matching is performed using a plurality of patterns so that halftone dots having any lines per inch can be detected. Matching using a large pattern is performed on halftone dots having low lines per inch, thus detecting whether the halftone dots having low lines per inch are halftone dots. Matching using a small pattern is performed on halftone dots having high lines per inch, thus detecting whether the halftone dots having high lines per inch are halftone dots. The shape of halftone dots also changes depending on the luminance. Thus, to support this change, levels are provided in matching. Next, the text determination unit 1402 performs an OR process on the isolation amount determination signal of each of the inside-edge signal and the outside-edge signal in an N×N region (e.g., a 3×3 region), thus obtaining an OR process signal. The text determination unit 1402 performs area integration on the OR process signal using a plurality of patterns (e.g., integrates pixels in an area using three patterns, namely a 9×9 region, a 15×15 region, and a 21×21 region) and compares the resulting values with thresholds determined in advance. The text determination unit 1402 determines whether a pixel of interest is a halftone dot based on the determination results, thus obtaining a halftone dot determination result.

The text-in-halftone-dots determination unit 1404 performs an adaptive smoothing process on the determination signal from the determination signal generation unit 1401. The adaptive smoothing process is a digital filter process for smoothing a desired frequency component of image data while excluding text and a thin line. Next, the text-in-halftone-dots determination unit 1404 performs a digital filter process for enhancing and extracting a desired frequency component of the image data. Typical examples of a filter used in the digital filter process include a second derivative filter, such as a Laplacian filter. The text-in-halftone-dots determination unit 1404 then determines an inside-edge signal using a threshold determined in advance. The text-in-halftone-dots determination is made for the purpose of extracting text itself in a halftone dot region. Thus, a portion outside the edge of text is regarded as a halftone dot region, and only a portion inside the edge of text is extracted, accordingly obtaining text in halftone dots.

Thus, the threshold determination is made using only a positive threshold, accordingly obtaining only the inside-edge signal. If the text-in-halftone-dots determination unit 1404 determines that text is present in halftone dots having the same lines per inch, the adaptive smoothing process is performed on this image. Thus, a halftone dot portion is smoothed, and the periodic structure of halftone dots disappears. Further, the smoothing of a text portion is excluded through the adaptive process. Thus, a text region remains clear. If the edge enhancement is further performed on this image, a text edge is enhanced. If the image subjected to the edge enhancement is subjected to the threshold determination process, only text in a halftone dot region can be extracted. Thus, a text-in-halftone-dots determination result can be obtained.

An attribute flag generation unit 1405 generates an attribute flag with respect to each pixel from the text determination result obtained by the text determination unit 1402, the halftone dot determination result obtained by the halftone dot determination unit 1403, and the text-in-halftone-dots determination result obtained by the text-in-halftone-dots determination unit 1404. The attribute flag to be generated can be determined as follows.

In the case of the halftone dot determination result: 1 & the text determination result: 0→the image attribute of the pixel of interest: halftone dots In the case of the halftone dot determination result: 0 & the text determination result: 1→the image attribute of the pixel of interest: text In the case of the halftone dot determination result: 1 & the text-in-halftone-dots determination result: 1→the image attribute of the pixel of interest: text in halftone dots Other than the above→the image attribute of the pixel of interest: a natural image; a photographic image; a gradation image The determination is made in the above manner, thus generating the attribute flag. Since the attribute flag has four types as described above, the attribute flag according to the exemplary embodiment includes 2 bits with respect to each pixel. In the second exemplary embodiment, when specified color removal is executed, an image attribute generated in the above processing is referenced, and based on whether the image attribute is halftone dots, the removal range of the specified color removal of the color conversion processing unit 303 is changed. The details will be described below with reference to FIG. 15.

<Method for Specified Color Removal>

FIG. 15 is a diagram illustrating the processing of specified color removal according to the second exemplary embodiment of the present disclosure. In the following processing, the processes of steps S1501 to S1506 are implemented by the CPU 111 of the image forming apparatus 101 loading a program stored in the ROM 112 into the RAM 113 and executing the program. The operation unit 120 displays an instruction to the user in a UI and receives an instruction from the user.

In step S1501, the CPU 111 causes the color conversion processing unit 303 to read attribute flags corresponding to an input image generated by the image region processing unit 307.

In step S1502, the CPU 111 determines whether "photographic paper photograph" is selected via the type-of-document selection button 523 displayed on the operation unit 120. If "photographic paper photograph" is selected, the document is not represented by CMYK process colors. Thus, the CPU 111 determines that it is not necessary to widen the removal range when specified color removal is performed in the subsequent steps. If the determination is YES (YES in step S1502), the processing proceeds to step S1505. If the determination is NO (NO in in step S1502), the processing proceeds to step S1503.

In step S1503, the CPU 111 causes the color conversion processing unit 303 to reference the attribute flag corresponding to each pixel in the input image and determines whether the attribute flag indicates "halftone dots". If the determination is YES (YES in step S1503), the processing proceeds to step S1504. If the determination is NO (NO in step S1503), the processing proceeds to step S1505.

In step S1504, the CPU 111 reads from the ROM 112 a processing parameter to be used for generating a three-dimensional LUT that enables the removal of a specified color component. The CPU 111 then sets the processing parameter in the color conversion processing unit 303. In the exemplary embodiment of the present disclosure, the removal range can be set by selecting two types, namely "standard" and "widen removal range". In this case, the CPU 111 reads a processing parameter corresponding to "widen removal range". The details of the input parameter are like those described with reference to FIGS. 10A and 10B in the first exemplary embodiment.

In step S1505, the CPU 111 reads from the ROM 112 a processing parameter to be used for generating a three-dimensional LUT that enables the removal of the specified color component. The CPU 111 then sets the processing parameter in the color conversion processing unit 303. In this case, the CPU 111 reads a processing parameter corresponding to "standard". The details of the input parameter are like those described with reference to FIGS. 10A and 10B in the first exemplary embodiment.

In step S1506, the CPU 111 causes the color conversion processing unit 303 to perform the specified color removal. The method for the specified color removal is like that in steps S1103 and S1108 in the first exemplary embodiment.

The CPU 111 can cause the printer unit 130 to execute printing based on image data in which a specified color is removed with the method according to the second exemplary embodiment. The CPU 111 can transmit image data in which a specified color is removed with the method according to the second exemplary embodiment to an external apparatus, such as the PC 102 via the network I/F 118.

As described above, according to the present exemplary embodiment, a configuration is employed in which a halftone dot region in an input image is extracted, and the removal range of specified color removal is changed between the halftone dot region and a region other than the halftone dot region. This configuration prevents the color from remaining without being removed after the specified color removal is performed, in a document represented by CMYK process colors. Thus, it is possible to improve image quality after the specified color removal and also improve the processing speed.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
    a user interface that receives designation of a color; and
    a controller that removes, from an image, a color of a range of hue based on the color of which the designation has been received by the user interface,
    wherein the controller removes, from an image of a region other than a halftone dot region, a color of a first range of hue based on the color of which the designation has been received by the user interface, and
    wherein the controller removes, from an image of the halftone dot region, a color of a second range of hue based on the color of which the designation has been received by the user interface, the second range of hue being wider than the first range.

2. The image processing apparatus according to claim 1, wherein the user interface further receives designation of a type of a document,
    wherein, in a case where the type received by the user interface is a first type, the controller removes, from the image of the halftone dot region and the image of the region other than the halftone dot region, the color of the first range of hue, and
    wherein, in a case where the type received by the user interface is a second type which is different from the first type, the controller removes, from the image of the region other than the halftone dot region, the color of the first range of hue and the controller removes, from the halftone dot region, the color of the second range of hue.

3. The image processing apparatus according to claim 2, wherein the first type is a photographic paper photograph.

4. The image processing apparatus according to claim 1, wherein the controller further determines the halftone dot region.

5. The image processing apparatus according to claim 4, wherein the controller determines the halftone dot region with pattern matching.

6. The image processing apparatus according to claim 1, further comprising:
    a scanner that scans a document,
    wherein the controller removes, from the image of the document, the color of the range of hue based on the color of which the designation has been received by the user interface.

7. The image processing apparatus according to claim 1, further comprising:
    a printer,
    wherein the printer prints the image of which color has been removed by the controller.

8. The image processing apparatus according to claim 1, further comprising:
    a communicator,
    wherein the communicator transmits the image of which color has been removed by the controller.

9. A color removing method comprising:
    receiving designation of a color; and
    removing, from an image, a color of a range of hue based on the color of which the designation has been received,
    wherein, from an image of a region other than a halftone dot region, a color of a first range of hue is removed based on the color of which the designation has been received, and
    wherein, from an image of the halftone dot region, a color of a second range of hue is removed based on the color of which the designation has been received, the second range of hue being wider than the first range.

10. A non-transitory computer readable storage medium for storing a computer program for causing a computer to execute a color removing method, the color removing method comprising:
    receiving designation of a color; and
    removing, from an image, a color of a range of hue based on the color of which the designation has been received,
    wherein, from an image of a region other than a halftone dot region, a color of a first range of hue is removed based on the color of which the designation has been received, and
    wherein, from an image of the halftone dot region, a color of a second range of hue is removed based on the color of which the designation has been received, the second range of hue being wider than the first range.

* * * * *